(12) United States Patent
Collier et al.

(10) Patent No.: US 11,247,490 B2
(45) Date of Patent: Feb. 15, 2022

(54) IMAGE REGISTRATION FOR PRINTING

(71) Applicant: NIKE, Inc., Beaverton, OR (US)

(72) Inventors: Michael D. Collier, Portland, OR (US);
Amie Evans, Beaverton, OR (US);
Laurel Manville, Beaverton, OR (US);
Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/005,732

(22) Filed: Aug. 28, 2020

(65) Prior Publication Data

US 2020/0391521 A1 Dec. 17, 2020

Related U.S. Application Data

(62) Division of application No. 16/176,867, filed on Oct. 31, 2018, now Pat. No. 10,759,190.
(Continued)

(51) Int. Cl.
| | |
|---|---|
| *B41J 3/46* | (2006.01) |
| *G06F 9/30* | (2018.01) |
| *B41F 33/00* | (2006.01) |
| *A43B 3/00* | (2022.01) |
| *B41J 3/407* | (2006.01) |
| *G06K 9/20* | (2006.01) |
| *B41J 11/00* | (2006.01) |
| *A43D 95/00* | (2006.01) |

(52) U.S. Cl.
CPC ............. *B41J 3/46* (2013.01); *A43B 3/0078* (2013.01); *A43D 95/00* (2013.01); *B41F 33/0081* (2013.01); *B41J 3/407* (2013.01); *B41J 3/4078* (2013.01); *B41J 11/008* (2013.01); *G06F 9/30003* (2013.01); *G06K 9/2063* (2013.01)

(58) Field of Classification Search
CPC ... B41J 3/46; B41J 3/4078; B41J 3/407; B41J 2/442; B41J 11/008; B41F 33/0081; G06K 9/2063; G06F 9/30003; A43D 95/00; A43B 3/0078
See application file for complete search history.

(56) References Cited

U.S. PATENT DOCUMENTS 5,459,941 A 10/1995 Lowe
6,011,627 A 1/2000 Mulligan et al.
(Continued)

FOREIGN PATENT DOCUMENTS

EP 2 861 426 A1 4/2015
EP 3 106 312 A1 12/2016

OTHER PUBLICATIONS

International Search Report and Written Opinion for related PCT Application No. PCT/US2018/058490, dated Feb. 18, 2019, 12 pages.

*Primary Examiner* — Kristal Feggins
(74) *Attorney, Agent, or Firm* — Klarquist Sparkman, LLP

(57) ABSTRACT

A method for printing on an article can include positioning an article in a print bed of a printing device. The fiducial is disposed in the print bed. The method can also include generating an image of the article and the fiducial, locating the fiducial in the image, using the fiducial to establish a point of reference relative to a print location on the article, providing a raster or vector graphic file comprising a graphic, printing a representation of the graphic on the article at the print location, and removing the article from the print bed.

20 Claims, 23 Drawing Sheets

Related U.S. Application Data

(60) Provisional application No. 62/579,769, filed on Oct. 31, 2017.

(56) References Cited

U.S. PATENT DOCUMENTS

| | | | |
|---|---|---|---|
| 6,336,694 B1 | 1/2002 | Ishizaka | |
| 6,933,738 B2 | 8/2005 | Martin et al. | |
| 7,090,324 B2 * | 8/2006 | Mizes | B41J 29/393 347/19 |
| 8,644,591 B2 | 2/2014 | Lin et al. | |
| 8,960,836 B2 | 2/2015 | Martin | |
| 9,155,357 B2 | 10/2015 | Chon et al. | |
| 9,227,391 B2 | 1/2016 | Baggen et al. | |
| 9,254,640 B2 | 2/2016 | Miller | |
| 2003/0145750 A1 | 8/2003 | Chang et al. | |
| 2011/0109686 A1 * | 5/2011 | McDowell | B41J 3/407 347/20 |
| 2013/0014330 A1 | 1/2013 | Romero et al. | |
| 2014/0277663 A1 | 9/2014 | Gupta et al. | |
| 2016/0076873 A1 | 3/2016 | Pangrazio et al. | |
| 2016/0089916 A1 * | 3/2016 | Miller | A43D 8/22 347/16 |
| 2016/0185145 A1 | 6/2016 | Miller | |
| 2016/0192553 A1 | 6/2016 | Kawaguchi | |
| 2016/0309630 A1 * | 10/2016 | Amano | G06T 3/4053 |

\* cited by examiner

| | |
|---|---|
| Base name | 999999_DFT_000-007 |
| Style | 999999 |
| Color | 000 |
| Size | 007 |
| Transport parameter | 15 |
| Print Configurations | WHITE.xml APT.xml VARNISH.xml |
| Left layers | 4 |
| Left-1 | x. 0.00 / y. 0.00 / 100% / 0.00 deg |
| Left-2 | x. 0.00 / y. 0.00 / 100% / 0.00 deg |
| Left-3 | x. 0.00 / y. 0.00 / 100% / 0.00 deg |
| Left-4 | x. 0.00 / y. 0.00 / 100% / 0.00 deg |
| Right layers | 4 |
| Right-1 | x. 0.00 / y. 0.00 / 100% / 0.00 deg |
| Right-2 | x. 0.00 / y. 0.00 / 100% / 0.00 deg |
| Right-3 | x. 0.00 / y. 0.00 / 100% / 0.00 deg |
| Right-4 | x. 0.00 / y. 0.00 / 100% / 0.00 deg |

FIG. 5

IMAGE REGISTRATION FOR PRINTING

CROSS-REFERENCE TO RELATED APPLICATIONS

This application is a divisional of U.S. patent application Ser. No. 16/176,867, filed Oct. 31, 2018, which claims the benefit of U.S. Provisional Patent Application No. 62/579,769, filed Oct. 31, 2017. Both of the prior applications are incorporated by reference herein.

FIELD

This disclosure relates generally to manufacturing systems and, more particularly, to flexible manufacturing systems and related methods.

BACKGROUND

Softgoods, such as articles of apparel and/or articles of footwear, are typically offered in a wide variety of sizes, styles, materials, and/or other characteristics of the product. Additionally, styles are constantly changing, for example, based on trends and/or season of the year. The variety and frequent change in product specifications can make manufacturing difficult.

BRIEF DESCRIPTION OF THE DRAWINGS

FIG. 5 depicts a screenshot illustrating exemplary configuration parameters.

DETAILED DESCRIPTION

General Considerations

Figure 1:
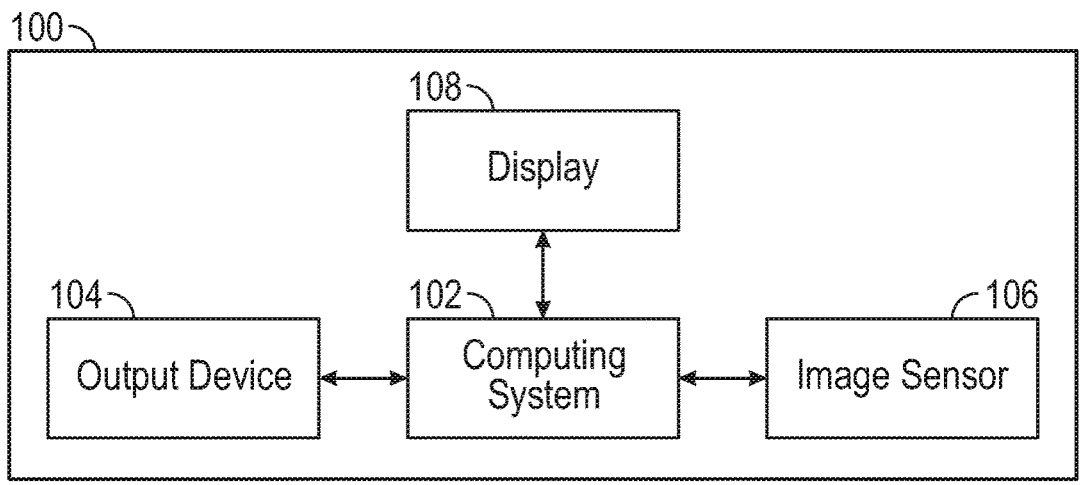
FIG. 1 depicts an exemplary embodiment of a system for implementing the disclosed technology.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another, as will be recognized by an ordinarily skilled artisan in the relevant field(s) in view of the information disclosed herein.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "generate," "display," "receive," "emit," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. In these instances, these terms are high-level descriptions for operations performed by a computer, and should not be confused with acts performed by a human being. The actual computer operations corresponding to these terms vary depending on implementation.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As used herein, the term "module" refers to a portion of hardware and/or computer-executable instructions that can be used to implement particular methods disclosed herein. Such modules can be implemented with a processor and memory storing computer-executable instructions that when executed by the processor, cause the processor to perform a particular method associated with the module. In some examples, such modules can be implementing using digital logic gates implemented as an application-specific integrated circuit (ASIC), a system-on-chip, and/or programmable logic (e.g., in a field programmable gate array (FPGA) integrated circuit).

Computer-readable media are any available media that can be accessed within a computing system. By way of example, and not limitation, with the computing system, computer-readable media include memory and/or storage. As should be readily understood, the term computer-readable storage media includes the media for data storage, such as memory and storage, and not transmission media such as modulated data signals.

Any trademarks used herein remain the property of their respective owners.

Introduction to the Disclosed Technology

Automated manufacturing processes can, for example, improve efficiency and quality control. Despite these and other advantages, however, typical automated manufacturing processes have disadvantages. For example, typical automated manufacturing processes can be extremely difficult or impossible to create and/or update when there is variation in the products to be manufactured. As a result, many products require manual processes which can increase labor cost and production time and can decrease quality control.

In particular, known automated printing systems, such as those used in the publishing industry, rely on initial manual or automated alignment of the substrate to be printed upon, relative to physical alignment reference points or barriers, including physically abutting a stack of paper sheets against a raised structural barrier (e.g., edges, walls, fences, etc.) of a loading platform, tray, rack, etc. Further, proper printing on existing printing systems necessarily relies upon both correct and consistent shape and dimensions of the substrate to be printed upon, in addition to accurate and precise initial alignment of the substrate. Any variation in shape, size, position, or orientation of the substrate results in misaligned, and/or incorrectly scaled printing of a graphic relative to a substrate.

Further, after initial alignment, many printing systems then reposition a substrate from a loading position to a printing position, during which process an initially properly-aligned substrate can shift position due to any number of influences (e.g., slippage relative to an underlying substrate or alignment structure, physical contact with an object/obstruction, displacement due to airflow or vibration, friction along a path of travel, etc.), resulting in misalignment of the substrate relative to an graphic applying structure (e.g., a print head, a stamp, a roller, an embosser, etc.), and therefore, misalignment of the printed graphic relative to the substrate.

While some printing systems allow a user to designate one of several substrate size options prior to printing (e.g., "letter size," "A4," "legal size," etc.), and scale an image up or down in size by designating a percentage increase or decrease, such options generally must be input by the user prior to running a print job (single or batch printing), and rely upon accuracy of user input. However, such user input, and initial alignment of a substrate such as described above, constitute a form of "dead reckoning." Once set, and printing is initiated, the printing system proceeds agnostically as to any initial or subsequently introduced variation in substrate size, shape, position, orientation, or surface variation or the substrate, any or all of which can inherently result in defects in size, shape, position, orientation, and/or distortion of the printed graphic relative to the substrate.

As will be recognized, existing printing systems used extensively in publication are designed to print on relatively flat (e.g., two-dimensional) substrates, such as sheets of paper, cardboard, metal, textiles, etc.). Printing systems that are configured for printing on three-dimensional objects heavily rely upon the substrate/article being symmetrical (e.g., round, as in the case of an Mars, Incorporated M&M chocolate candy) to assure consistent placement of the graphic relative to the article. Alternatively, when printing on irregularly sized and shaped articles, the graphic size is maintained, and inconsistent positioning relative to the article is tolerated, such as in the case of peanut M&M candies, for example.

However, no current printing systems are known to the inventors, that are capable of automatically identifying the size, shape, rotation, z-height, contour, or other variations of each article loaded onto the printing system, whether loaded individually or in multiples (e.g., as a pair, or a batch), nor separately, automatically, and virtually (e.g., in its digitized form) altering/transforming a digitized graphic specifically relative to any or all detected conditions of the article to be printed upon, including: article type (e.g., based on the presence or absence of one or more optically-detectable features, including features solely or primarily detectable at wavelengths typically invisible to human eyes, such as but not limited to wavelengths within the ultraviolet or infrared ranges), size, position (e.g., in one or both of the X and Y axes), orientation (e.g., in any or all three-dimensional rotational axes), height (in Z axis), contour (e.g., variations in Z-axis height across a viewable surface of the substrate.

For example, no printing system is known to the inventors that can receive, for example, simultaneous loading of two different shoes, of different types (e.g., a high top basketball shoe for the left foot, and a low top running shoe for the right foot), different sizes (e.g., one children's size 3T shoe and one adult men's size 9 shoe), wherein one shoe is shifted in one or both of the X and Y axes relative to the other shoe, and/or wherein a longitudinal or other axis of one of the loaded shoes is rotated off axis relative to the respective corresponding axis/axes of the other loaded shoe and/or relative to a printing mechanism (e.g., an ink jet print head), where in the shoes present different colors and/or different aesthetic designs relative to each other, and wherein the graphic(s) to be printed upon one of the shoes is/are different in any one or more of type, size, position, orientation, or color than the graphic(s) to be printed upon the other shoe, and wherein after manual or automated loading is of the shoes is complete, the printing system automatically identifies the individual type, size, position, orientation, and/or color conditions of each of the shoes, digitally alters one or more graphics to be printed upon each of the shoes in one or more of type, size, position, orientation, and/or color, and correctly prints the graphics onto each shoe with respect to type, size, position, orientation, and color.

As will be recognized by an ordinarily skilled artisan in the relative fields, in view of the entire description, drawing figures, and claims provided herein, the invented embodiments provide printing systems with such capabilities. In one or more embodiments, an existing printer can be retrofitted with one or more of the invented features, thereby endowing the printer with one or more capabilities that it previously did not possess. In one or more other embodiments, a printer can be initially designed and produced so that it includes one or more of the invented features, constituting a new printer with one or more capabilities that do not exist in previous printers.

As used herein, the term "articles" includes "wearable articles" such as articles of apparel and/or articles of footwear (collectively and/or alternatively referred to herein as "articles" or an "article"). For example, such articles are typically made from soft-goods (e.g., textiles, polymers, and/or other natural or synthetic materials) that are relatively bendable and/or stretchable compared to hard-goods (e.g., metal, wood, etc.), although some articles can also include relatively rigid and/or inelastic structures (e.g., metal lace eyelets, rigid embellishments, etc.) Such articles can also be produced in a wide range of sizes and have frequently changing styles, colors, materials, and other features based on trends, season, and/or other reasons. Such articles are examples of manufactured products with the variation mentioned above. Demand for customization and/or personalization can further increase variation in such articles. Accordingly, developing automated manufacturing processes for articles is extremely difficult and time consuming.

Disclosed herein are exemplary methods, devices, and/or systems that can be used, for example, to automate and/or more quickly automate manufacturing processes for articles. For example, the technology disclosed herein can be used to generate a shape model that can be used in manufacturing processes (e.g., printing) to account for variation in size, color, material, and/or other characteristic of such articles.

As used herein, a shape model is a representation of the extractable edges of an article, or a figure in an image of the article, that can be used to find corresponding shapes in other articles or images of other articles. For example, a shape model can be generated based on an article having a particular color scheme and size, and a system can then use the shape model to detect one or more other articles with various other color schemes and/or sizes. In other words, the system can use a shape model of an article (for example, generated from a men's size 9 with black/white color scheme) to recognize and process a plurality of different articles (for example, a men's size 12 with a red/green color scheme). This can, for example, improve the ease with which automated processes can be generated, reduce the reliance upon and throughput time necessarily involved with many imprecise manual processes (e.g., loading and aligning articles (including, e.g., asymmetrical and three-dimensional articles) onto a printing system, and/or improve quality control (including accuracy and precision/consistency of the placement, orientation, size/scale, etc.) of graphics printed onto articles.

The system can generate the shape model based on an image of an article, and can recognize other articles based on images of the other articles.

In particular embodiments, the disclosed methods, devices, and/or systems can be used for generating shape models when the target is a single color and intensity on a uniform background and/or had sharp edges with no or few interfering features, and/or when the target is not flat, not evenly lit, has complex graphics that interfere with the target, and/or has textures. In some embodiments, the disclosed methods, devices, and/or systems can be configured, for example, to help isolate the useful edges needed for an accurate shape model from the noise, distortions, and/or other interferences in the image.

In some embodiments, the shape model can be used to quickly and accurately align an article with manufacturing equipment (e.g., a printer). For example, in certain embodiments, the location of the article can be determined in the processing space of the manufacturing equipment.

In some embodiments, a fiducial can be used to generate a shape model and/or to align an article with manufacturing equipment. In some embodiments, the fiducial can, for example, be a physical feature of the article (e.g., a logo, edge, seam, perforation, pattern, etc.). Additionally or alternatively, a fiducial can be one or more other components that are coupled to or adjacent the article and/or the processing equipment (e.g., a printer).

In some embodiments, the processing equipment can comprise an automatically movable work space which can align a plane of the fiducial with a plane of the processing equipment.

It should be noted that although many of the examples described herein are directed to printing a graphic on an article, various other output devices besides printing systems can be used with the disclosed technology. For example, the output device can be a cutting tool such as a laser or other type of device (e.g., a sewing machine or an adhesive applicator).

Exemplary Embodiments

FIG. 1 shows a schematic view of an exemplary embodiment of a flexible manufacturing system 100 (also referred to as the system 100). In this basic configuration, the system 100 can comprise a computing system 102, an output device 104 (e.g., a two-dimensional or a three-dimensional printer, etc.), an image sensor 106 (e.g., an image capture device such as a video and/or still camera, etc.), and a display 108 (e.g., a viewable monitor device). The computing system 102 can be coupled to the output device 104, the image sensor 106, and the display 108. The computing system 102 can include components that control the functionality of the output device 104, the image sensor 106, and the display 108. One or more additional components can be included in the system.

In some embodiments, the system 100 can be used with various kinds of articles, including such wearable articles as articles of footwear and/or articles of apparel. For example, articles of footwear can include running shoes, soccer shoes, football shoes, rugby shoes, basketball shoes, baseball shoes, sneakers, hiking boots, sandals, socks, and other types of footwear. Articles of apparel can, for example, include hats, scarves, jackets, shirts, dresses, sweaters, gloves, undergarments, ties, vests, shorts, pants, as well as other wearable and non-wearable apparel. Articles herein can also include wearable and/or portable "accessory articles," including bags, purses, backpacks, jewelry, hair retention embellishments (e.g., clips, ties, etc.), watchbands/watches, sashes, etc.

The system 100 can be used with other objects that can be processed by the output device 104, including "equipment articles," and more specifically including "athletic equipment articles" such as shin guards, knee pads, elbow pads, shoulder pads, balls, bats, helmets, hockey sticks, support tape, and other forms of equipment possessing printable surfaces.

Although several types of articles are specifically identified herein as examples that can be printed upon within the disclosed inventive embodiments, the contemplated uses and embodiments extend to a wide range of articles including consumer and industrial goods and/or packaging, including tools, documents, medical goods and pharmaceuticals, textiles, food, kitchenware, bedding, automotive parts, electronic components or assemblies, multimedia items (e.g., optical storage media, memory cards), etc. In a broad sense, the inventive embodiments can include use with anything that includes a printable surface (e.g., a surface that can be printed upon), and that can either be loaded onto a printer or that a printer can be positioned relative to, for printing upon the article.

In certain embodiments, the system 100 may include various kinds of components for applying graphics, or any type of design or image, to articles. Moreover, the process of applying graphics may occur during manufacturing (e.g., assembly) of an article and/or after an article has been manufactured.

In some embodiments, graphics or graphic images may be applied to an article of footwear after the article of footwear has been manufactured into a three-dimensional form including an upper and sole structure. In some embodiments, a flexible manufacturing system can be used at a retail location to apply user-selected graphics to articles of footwear and/or articles of apparel.

The term "graphic" as used herein refers to any visual design feature including: photographs, logos, text, illustrations, lines, shapes, patterns, images of various kinds, as well as any combinations of these features. Moreover, the term graphic is not intended to be limiting and can incorporate any number of contiguous or non-contiguous visual features.

For example, in an exemplary embodiment, a graphic may comprise a logo that is applied to a small region of an article of footwear. In another embodiment, for example, a graphic can comprise a large region of color that is applied over one or more regions, or the entirety, of an article of footwear.

In some embodiments, the output device 104 can comprise various components that are useful in applying a graphic directly to an article. In certain embodiments, the output device 104 can be a printing system. The printing system can comprise one or more individual printers. In some embodiments, the printing system can include two or more printers that are networked together.

As used herein, the term "article printing device" can refer to any type of system that can print on a textile, an article of footwear, an article of apparel, or other object. This includes printers, plotters, 3-D printers and/or 3-D printing systems. The article printing device can use any type of printable material that can be dispensed by a printer, including but not limited to natural or synthetic inks (e.g., ultraviolet ("UV")-curable ink, acrylic resin ink, polyurethane ink, TPU ink, silicone ink, etc.), adhesives, sealants, and photoreactive materials (e.g., photochromic, photoluminescent, etc.).

The printing system can utilize various types of printing techniques. These can include toner-based printing, liquid inkjet printing, solid ink printing, dye-sublimation printing, inkless printing (including thermal printing and UV printing), resin deposition, microelectromechanical systems ("MEMS"), jet printing technologies, as well as any other suitable method of printing. In some embodiments, the printing system can make use of a combination of two or more different printing techniques. The type of printing technique used can vary according to factors including material of the target article, size and/or geometry of the target article, desired properties of the printed image (such as durability, color, ink density, etc.) as well as printing speed, printing costs, and maintenance requirements, to name a few.

In one or more embodiments, the printing system can utilize an inkjet printer in which ink droplets can be sprayed on a substrate, such as the medial or lateral side panel of a formed upper. Using an inkjet printer can, for example, allow for variation in color and ink density. This arrangement can also allow for some separation between the printer head and the target object, which can facilitate printing directly on objects with some curvature and/or surface texture.

In some embodiments, the system 100 can include one or more cameras, which can include an image sensor 106. For example, in an embodiment, the camera can be a "Basler ace acA4600-10uc" camera from Basler AG of Ahrensburg, Germany with a "MT9F002 CMOS" image sensor from ON Semiconductor of Phoenix, Ariz. In other embodiments, two or more cameras can be used to generate a three-dimensional image. In other embodiments, one or more analog cameras can be used to generate an image and the generated analog image can be converted to a digital image format.

The system 100 can include components for facilitating the alignment of a printed graphic on an article. For example, the image sensor 106 can capture an image of the article. The computing system 102 can use the image from the image sensor 106 to align the location of the article in the workspace of the output device with a coordinate system of the output device (this is sometimes referred to as creating "real world" coordinates). The image can be expressed in a digital image format (e.g., RAW, JPEG, TIFF, etc.) and can be displayed on the display 108. Using the computing system 102 and with the coordinates of the image of the article, coordinates of the article, and coordinates of the output device, a user can position a graphic on the image of the article, and the output device 104 can place the graphic on the article in a physical location that corresponds to the image location. In other words, the location of the graphic relative to the article as displayed on the display will be the location that the graphic will be printed on the article.

The coordinate system can be Cartesian, polar, cylindrical, spherical, or another type of coordinate system. The coordinate system can, for example, be used to determine position, rotation, size, and/or other relationship of the graphic with respect to the article, as further explained below.

The system 100 can include further components for facilitating the alignment of a printed graphic on an article. In some embodiments, it may be useful to provide a user with a way of aligning the article with the printing system so as to ensure the graphic is printed in the desired portion (i.e., location) of the article. For example, in some embodiments, the system 100 can include components for pre-aligning the article with the printer in such a way as to accommodate articles of various types, shapes and/or sizes. In certain embodiments, the system 100 can include lasts, jigs, and/or other types of devices configured for holding and/or manipulating an article.

In some embodiments, the system 100 can include audio and/or haptic devices. For example, the system can emit a tone when a graphic is aligned or misaligned.

The display 108 can comprise a touchscreen, a monitor, and/or other viewing device. The display 108 can, for example, provide a graphical user interface ("GUI") allowing user interaction.

Figure 2:
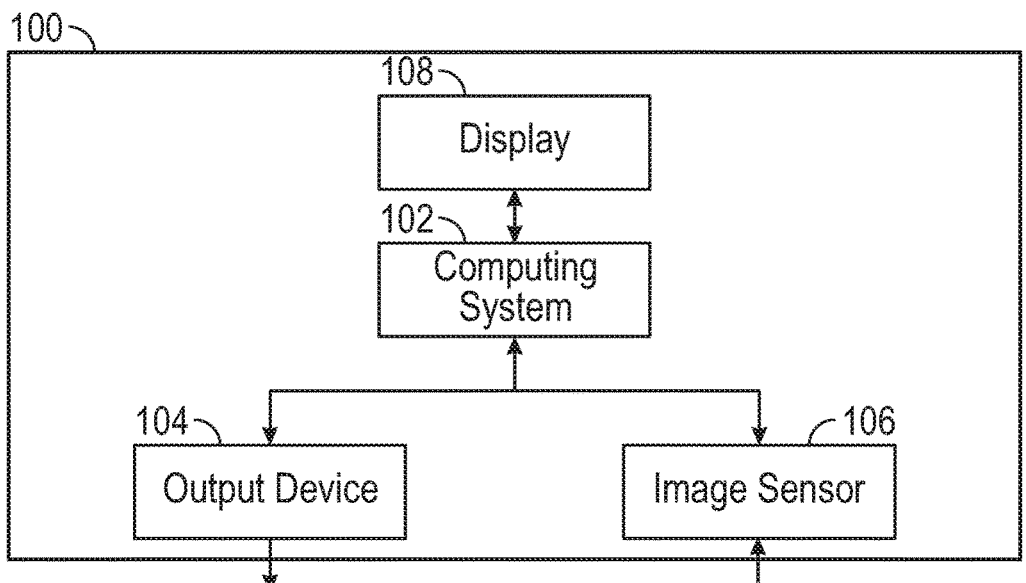
FIG. 2 depicts the system of FIG. 1 being used to process an exemplary article of footwear.
Figure 2:
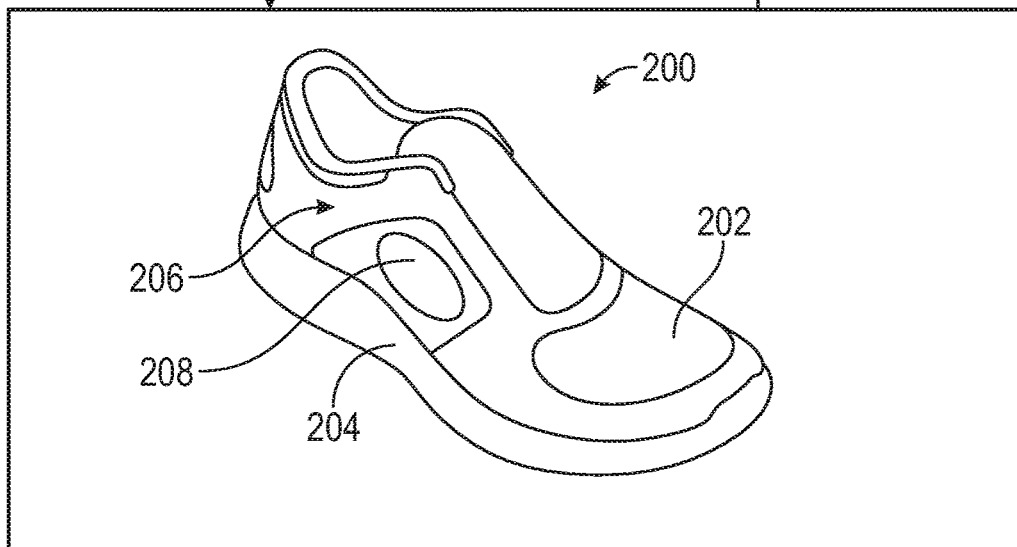

Referring to FIG. 2, the system 100 can, for example, be used to apply graphics to an article, such as article of footwear 200. In the certain embodiments, the article 200 can take the form of an athletic shoe, such as a running shoe. It should be noted, however, that the system 100 can be used with any other kind of article or object with a printable surface. Also, although the article 200 shown is only one article, the system 100 can be used to apply graphics to two or more articles that are simultaneously supported by the system 100, including articles that make up a pair of footwear (e.g., a left article and a right article).

In some embodiments, the article 200 can include an upper 202 and a sole structure 204. Generally, the upper 202 can be any type of upper that comprises a printable surface regardless of the design, shape, size, and/or color. For example, in embodiments where the article 200 is a basketball shoe, the upper 202 can be a high-top upper that is shaped to provide high support on an ankle. In embodiments where the article 200 is a running shoe, the upper 202 can be a low-top upper. In other embodiments, the article 200 can be various other types of footwear (e.g., sandals) with other types of uppers (e.g., straps).

In some embodiments, the upper 202 can have a generally contoured shape that approximates the shape of the foot. For example, a lateral side portion 206 of the upper can be generally contoured, rather than substantially flat. Moreover, it will be understood that the shape of the lateral side portion 206, as well as any other portion of the upper 202, can vary from one embodiment to another. In particular, the principles described herein for applying graphics to an article of footwear are not limited to articles with any particular geometry and/or shape, but rather are broadly applicable to a wide variety of articles and article shapes.

In some embodiments, the upper 202 can be configured with one or more design features. For example, the upper 202 can include a design feature 208, which is disposed on lateral side portion 206. In the illustrated embodiment, the design feature 208 takes the form of an oval-like design on upper 202. However, in other embodiments, the design feature 208 can be configured as any of a wide variety of indicia, graphic images, or other design features. Examples of various design features that can be incorporated into the upper 202 include logos, numbers, letters, graphics, trim elements, as well as other kinds of design features. Moreover, in some embodiments, the design feature 208 can be applied to the upper 202 using inks, for example, by using a printer. In other embodiments, a design feature can comprise a separate material layer that is attached to a base layer of the upper 202.

Figure 3:
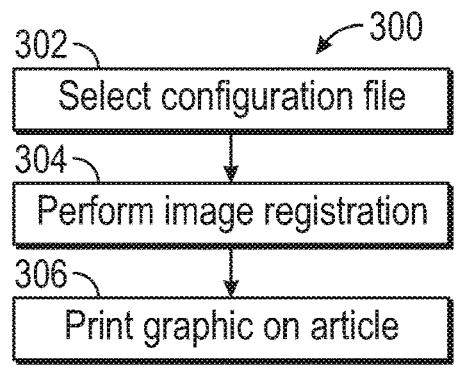
FIG. 3 depicts a flow chart outlining an exemplary method of printing a graphic on an article.

As mentioned above, the system 100 can be used, for example, to place a graphic on the article 200. FIG. 3 shows an exemplary method 300 for placing a graphic on an article which can be performed by the system 100. The method 300 can comprise selecting a configuration file for the article (process block 302), performing image registration of the article (process block 304), and printing the graphic on the article (process block 306).

Figure 4:
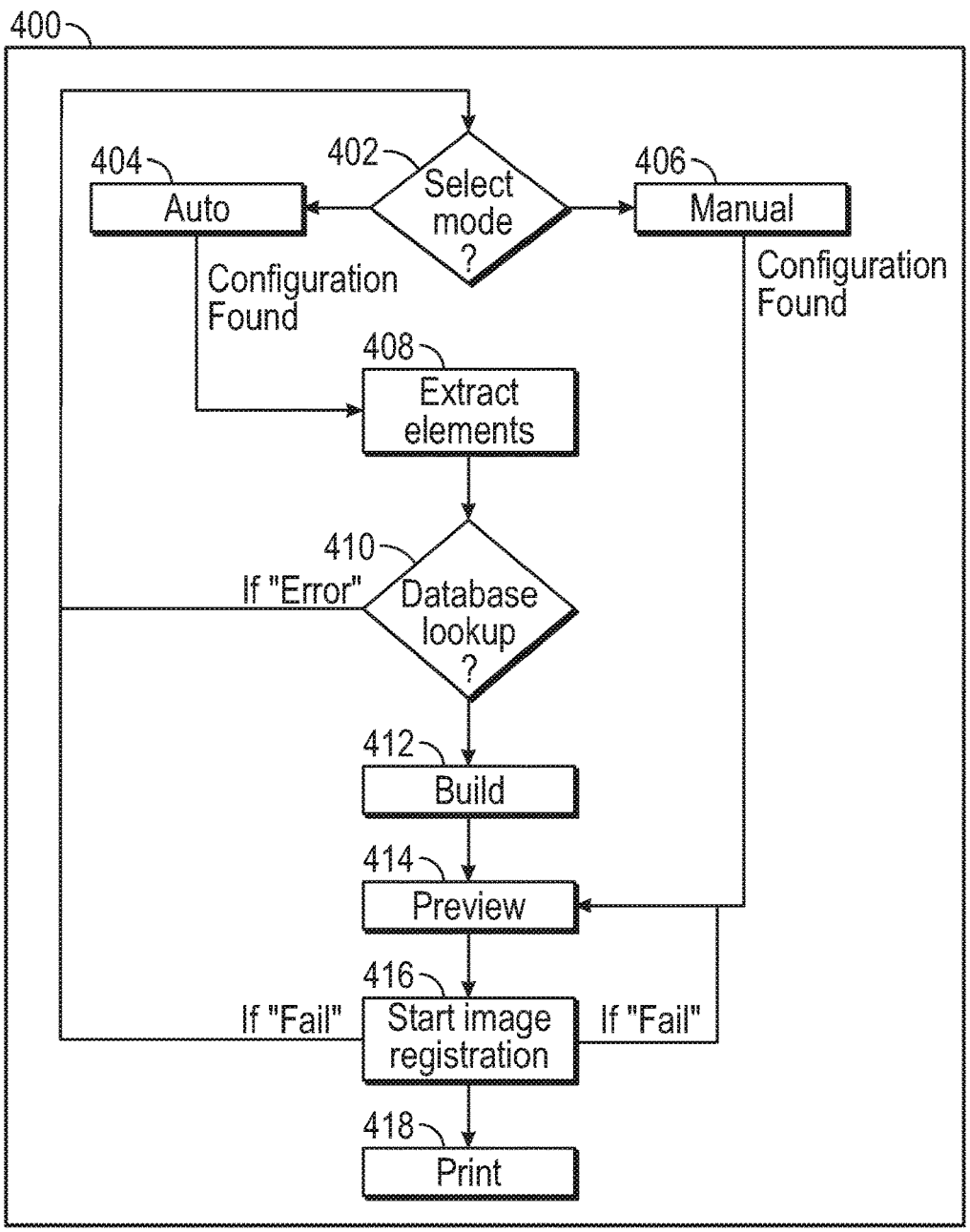
FIG. 4 depicts a flow chart outlining another exemplary method of printing a graphic on an article.

FIG. 4 shows an exemplary method 400 for placing a graphic on an article which can be performed by the system 100. The method 400 can comprise selecting a mode of operation (decision block 402), such as auto (process block 404) or manual (process block 406).

If a user selects auto mode, the user can, for example, scan a product identification image (e.g., a barcode, quick response ("QR") code, a watermark, etc.) that is linked to a configuration file. The system 100 can extract features (process block 408) from the configuration file. The features of the configuration file can comprise information about the article such as style, color, and/or size, to name a few. The system 100 can perform a database lookup (process block 410). If the configuration parameters are not found, the user can re-select the mode (decision block 402) and attempt to identify and/or build the configuration again. If the configuration parameters are found, the configuration build can be provided (process block 412). The user can preview the configuration parameters (process block 414). The configuration parameters can be stored, for example, as a comma-separated values (CSV), Excel, database, or other suitable file type.

If the user selects manual mode, the user can provide input (e.g., via a keyboard, touchscreen, mouse, and/or microphone) or select a configuration file. The system 100 can search for and locate the configuration file (e.g., an .xml file stored locally or accessed from a network file location). If the configuration file is found, the user can preview the configuration parameters (process block 414).

In either auto or manual mode, the system 100 can perform image registration (process block 416). If image registration fails, the user can re-select the mode (decision block 402) and rebuild the configuration. Alternatively, the user can review the preview (process block 414) and attempt the image registration again (process block 416). If image registration is successful, the system 100 can print the graphic on the article (process block 418).

In some embodiments, configuration parameters can include the shape model, XY offset, scale, angle, print configuration, transport configuration number, and graphic maker, as well as other parameters. For example, FIG. 5 shows a screen shot of exemplary configuration parameters 500. The parameters 500 can, for example, include base name (e.g., a model number), a style, color number, size, transport parameter, print configuration, and/or a number of layers for the left and/or right article. For each layer (e.g., four for both the left and right articles), the parameters can include an X location, a Y location, a scale, and a rotational orientation (collectively referred to as a "configuration"). Although each of the layers has the same configuration for each layer in the illustrated embodiment, each layer can have either the same or a different configuration than one or more other layers of either the left or the right article.

Shape Model Generation and Fiducials

The system 100 can be used, for example, to generate a shape model. As mentioned above, the shape model can be a representation of the extractable edges of the desired object or figure in the image that can be used to find corresponding shapes in other images.

Figure 6:
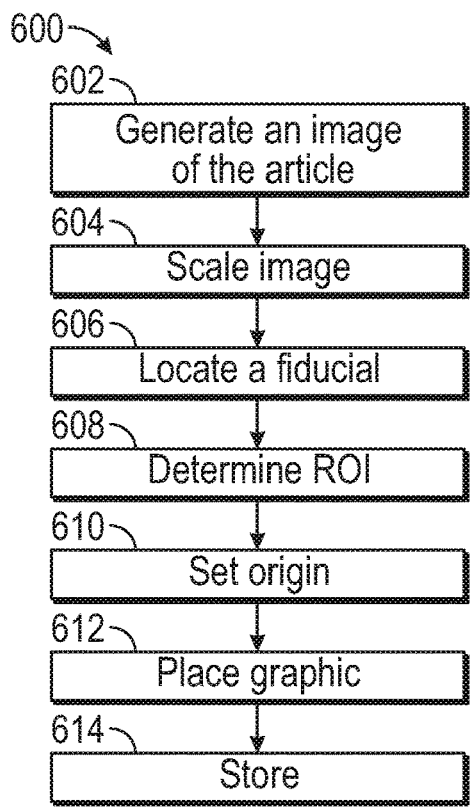
FIG. 6 depicts a flow chart outlining an exemplary method of generating a shape model profile.

FIG. 6 shows an exemplary method 600 for generating a shape model. The method 600 can comprise generating an image (process block 602), scaling the image (process block 604), locating a fiducial in and/or on the image (process block 606), determining a region of interest ("ROI") (process block 608), setting an origin (process block 610), placing a graphic marker (process block 612), and/or saving the shape model (process block 614).

In some embodiments, for example, an article (e.g., the article 200) can be placed in the work space (e.g., a print bed) of the output device 104. The image sensor 106 can be used to generate an image of the article. The image can be in any suitable digital image format (e.g., RAW, PNG, etc.). The image can then be scaled to a 1:1 ratio. For example, in some embodiments, the image can be scaled such that 1 mm on the image of the article is equal to 1 mm on the article.

The system 100 can locate a fiducial marker in the image. Generally speaking, a fiducial marker (or fiducial) is an object or marker that is placed in the field of view of the image sensor 106, appears in the image produced, and is used as a point of reference. In some embodiments, it can be a component or characteristic of the imaging subject (e.g., the article). In other embodiments, it can be placed into or on the imaging subject and/or be a mark or set of marks in the field of view of the image sensor 106. Thus, the fiducial can, for example, be used to establish one or more points of reference for use by the output device 104 (e.g., a printer).

The fiducial marker can be any characteristic or property that can be identified in an image generated by the image sensor 106. In some embodiments, the fiducial marker can comprise a single point. With a single point, bi-directional orientation (e.g., x-y coordinates) can be obtained.

In other embodiments, the fiducial marker can comprise more than one point (e.g., two or more points). With more than one point, bi-directional orientation (e.g., x-y coordinates), angle, and/or scale can be obtained. The fiducial marker can be used to identify an exact position of the article in the workspace. This can, for example, make positioning, aligning, and scaling, of a graphic more efficient (e.g., quicker and easier) than if these determinations have to be performed manually each time an article is positioned in the work space for processing by the output device 104.

The fiducial marker can, for example, be used during an original manufacturing process of the article, such as when making or assembling one or more of the components of the article. In other embodiments, the fiducial can, for example, be used during a post-manufacturing process (e.g., customization and/or alteration).

In certain embodiments, the fiducial marker can be an integral part of the article, either visible or not visible. For example, the fiducial marker can be a component and/or a portion of a component of the article that is a design feature, such as a logo and/or surface pattern, on the completed article. In other embodiments, the fiducial marker can be a removable, temporary component or on a portion of a component of the article that is not a visible on the completed article.

Figure 7:
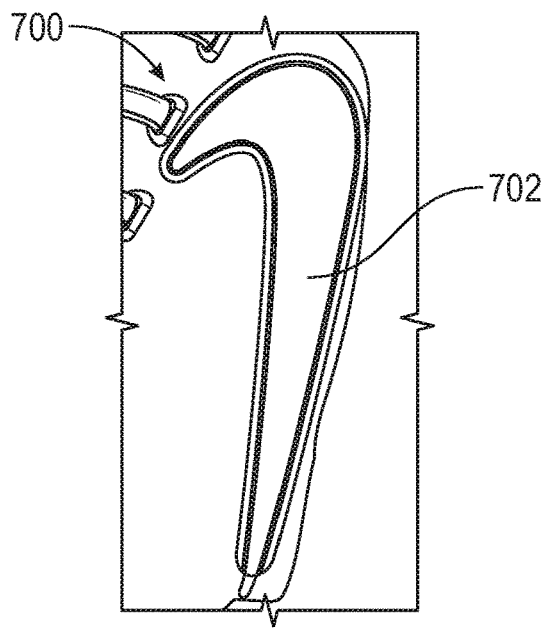
FIG. 7 depicts an exemplary embodiment of a fiducial marker.

For example, in some embodiments, the system 100 can comprise computer-readable storage media storing computer-readable instructions that cause a processor to identify particular regions or parts of the article and/or to locate a logo as a fiducial. For example, FIG. 7 shows a portion of an exemplary article 700 in which a logo 702 (e.g., the NIKE® swoosh) is the fiducial marker. In other embodiments, the fiducial marker can be any graphic printed on the article. The fiducial marker need not be a contiguous shape. For example, the fiducial marker can be three stripes that are spaced apart.

Figure 8:
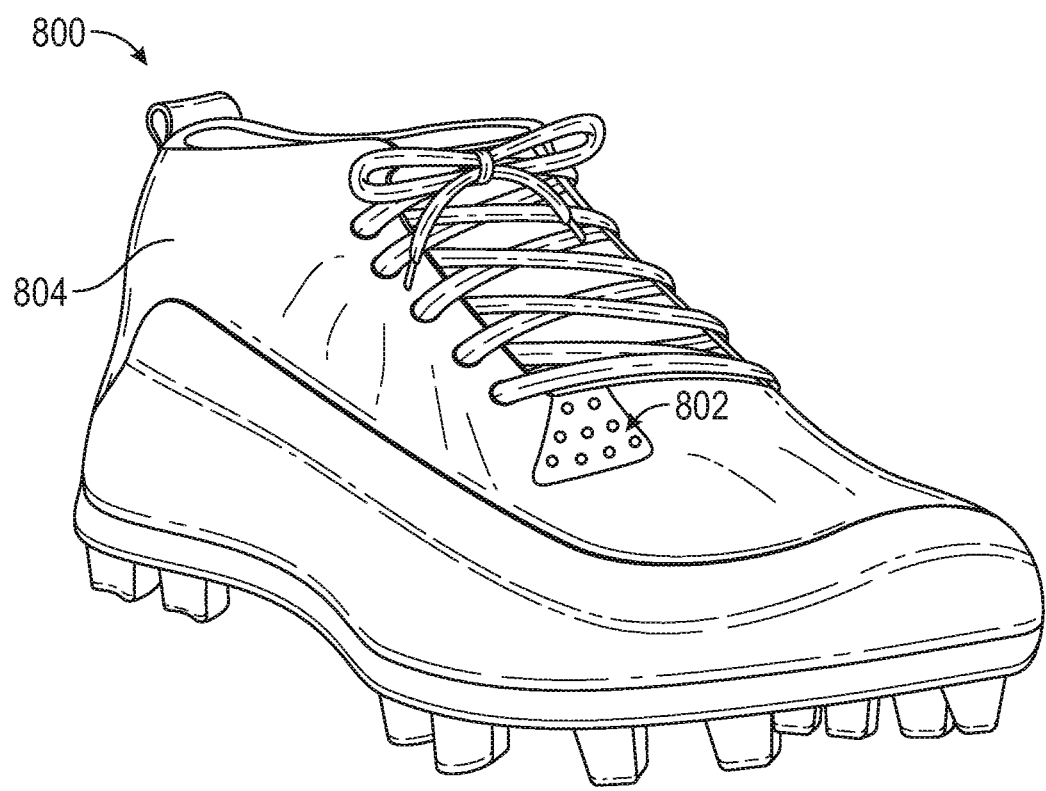
FIG. 8 depicts another exemplary embodiment of a fiducial marker.
Figure 9:
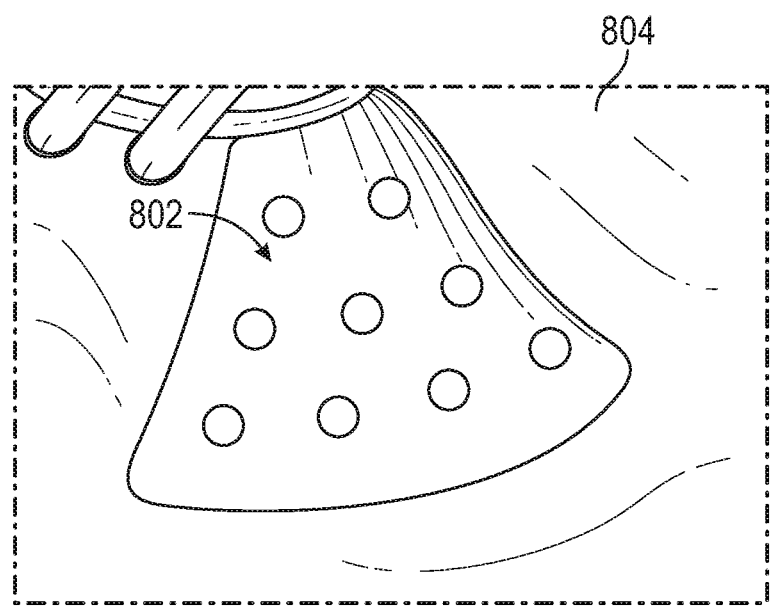
FIG. 9 depicts a detail view of the fiducial marker of FIG. 8.

In some embodiments, the system 100 can comprise instructions configured to identify particular regions or parts of an article and to locate a pattern in and/or on the article as a fiducial (e.g., lace eyelets, cleats, a bite line contour, an end of a heel portion, an edge of an upper, a collar portion, and/or one or more surface patterns). For example, FIGS. 8-9 show an exemplary article 800 comprising a plurality of perforations or apertures 802 on an upper 804 of the article which can be used as a fiducial.

Figure 10:
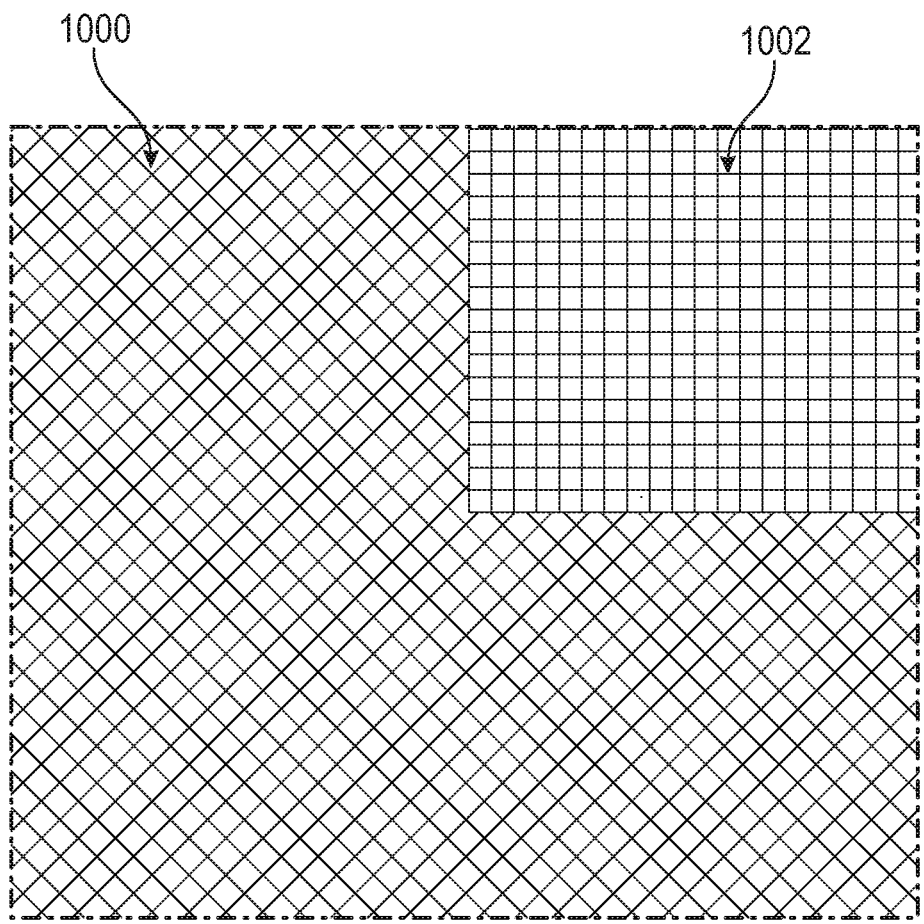
FIG. 10 depicts another exemplary embodiment of a fiducial marker.

In particular embodiments, a pattern change in a knitted and/or woven article can be detected and used as a fiducial. For example, FIG. 10 shows a portion of an exemplary article 1000 having a pattern change 1002, which can be used a fiducial. Such embodiments can improve printing accuracy, because while lasts tend not to change position, an article comprised of knit and/or woven material can shrink and/or the textile can shift. Accordingly, this process can, for example, accommodate such shrinkage and/or shifts in position. This process can, for example, allow the output device 104 system to perform work (e.g., print artwork) in the correct area after alignment with the fiducial, which therefore improves the quality and/or consistency of the article.

Figure 11:
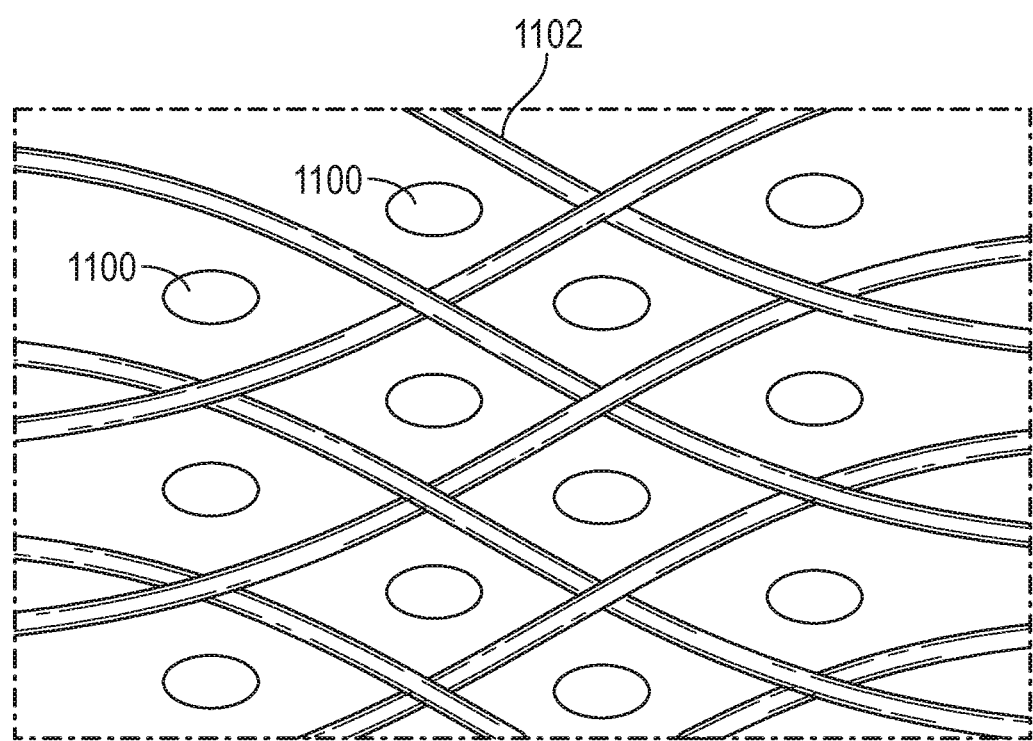
FIG. 11 depicts another exemplary embodiment of a fiducial marker.

In some embodiments, as shown in FIG. 11, a fiducial marker can include one or more locating pins 1100 (e.g., twelve in the illustrated embodiment) of a knitting loom, which can, for example, be used for manufacturing an exemplary knitted article 1102.

Figure 12:
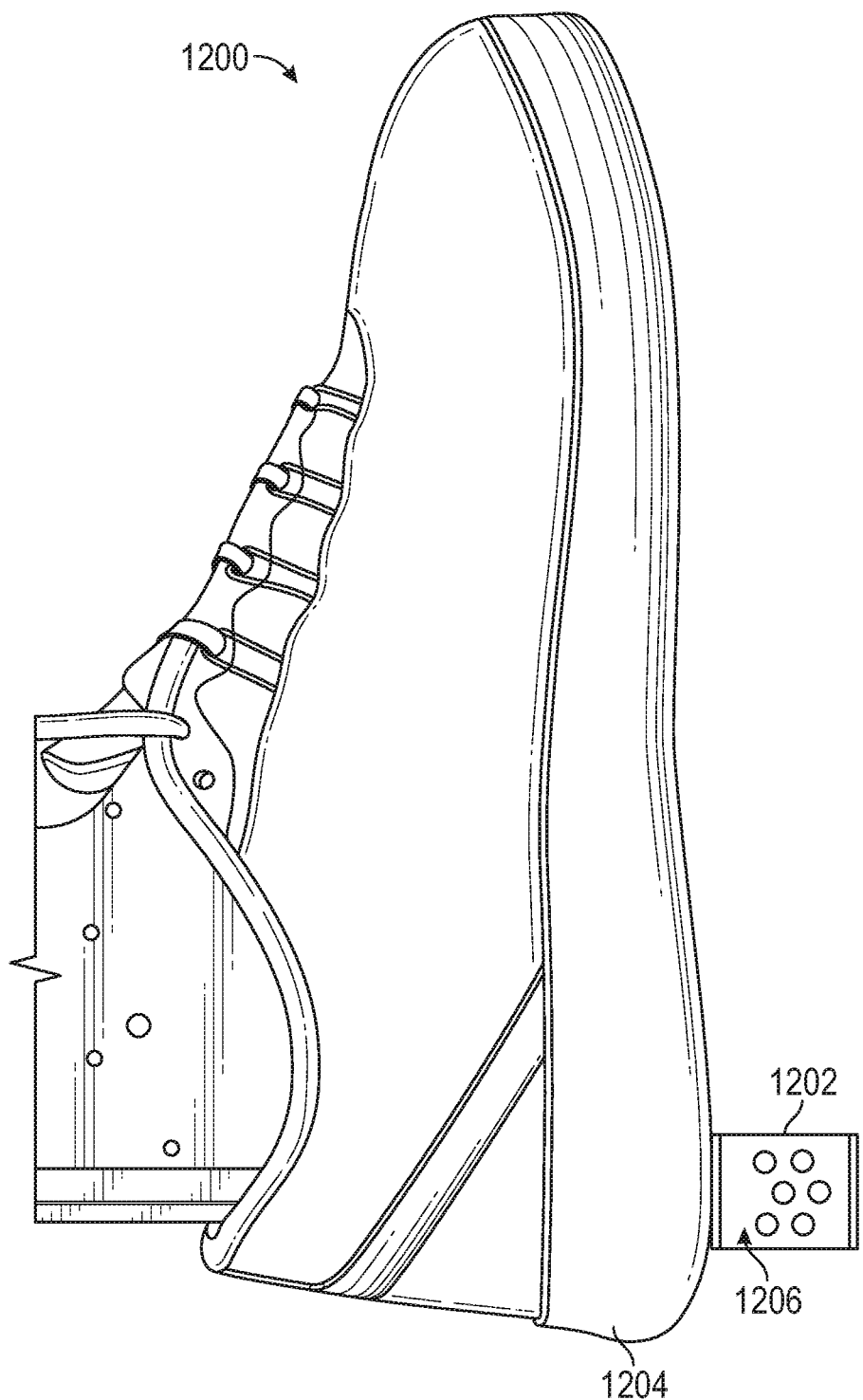
FIG. 12 depicts another exemplary embodiment of a fiducial marker.

In some embodiments, a fiducial marker can be disposed or located on a temporary and/or sacrificial member that is coupled to the article (e.g., a tab or swatch) and that can be removed from the article once processed by the output device 104. For example, FIG. 12 shows an exemplary article 1200 with a sacrificial tab 1202 coupled to a sole structure 1204. The tab 1202 can include a fiducial marker 1206 (e.g., six dots). Although not shown, the tab 1202 can have features that facilitate removal of the tab 1202 (e.g., perforations) after the article is processed by the output device 104.

A sacrificial tab can be coupled to an article in various ways. For example, in some embodiments, the sacrificial tab can be integrally formed as a single, unitary piece with one or more portions of an article (e.g., an upper and/or a sole structure). This can be accomplished, for example, by co-molding the sacrificial tab and the one or more portions of the article. In other embodiments, the sacrificial tab can be formed as a separate component that is coupled to one or more portions of the article (e.g., an upper and/or a sole structure), for example, with adhesive, fasteners, and/or other means for coupling.

In some embodiments, a fiducial marker can, for example, be visible to the system 100 only under certain lighting conditions, such as under light that is not within the visible spectrum (e.g., light having a wavelength of about 380 nm-750 nm). For example, in some embodiments, a fiducial marker can be visible to the system 100 only under UV, infrared, and/or other non-visible lighting conditions. In such embodiments, a fiducial marker can include UV fluorescent ink and/or UV fluorescent material (e.g., thread, yarn, textile, etc.). The fiducial marker can then be exposed to UV light prior to and/or during image generation to make the fiducial marker visible to the image sensor 106. The system 100 can then use the fiducial as a reference point to align the output device 104.

Figure 13:
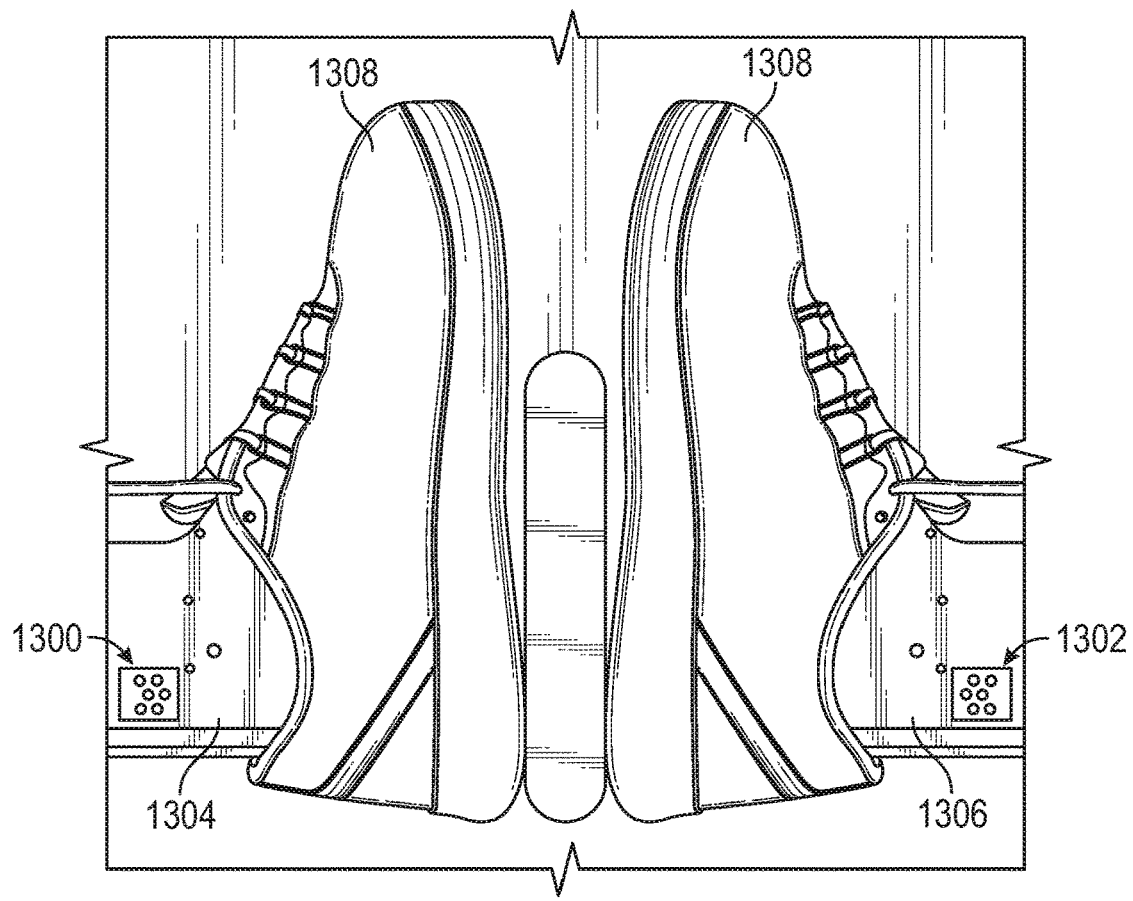
FIG. 13 depicts another exemplary embodiment of a fiducial marker.

In some embodiments, a fiducial marker can be a component of the output device and/or can be coupled to the output device 104. For example, FIG. 13 shows first and second fiducial markers 1300, 1302 disposed on first and second lasts 1304, 1306, respectively. In the illustrated embodiment, each fiducial marker 1300, 1302 comprises 6 dots. Five of the dots are arranged in a partial hexagonal pattern (i.e., one dot missing from being a complete hexagon), and the remaining dot is located in the center of the partial hexagon. This dot configuration can, for example, allow a rotation, orientation, and/or relative angle of the fiducial marker to be determined by the system 100. In other embodiments, various other patterns of dots and/or other types of indicators can be used.

Referring still to FIG. 13, in some embodiments, articles 1308 can be placed on the lasts 1304, 1306, and the fiducials 1300, 1302, which are coupled to the lasts, can be used as reference points.

Additionally or alternatively, a fiducial can be coupled to a structure within the workspace (e.g., a print bed) of the output device 104.

In some embodiments, the articles 1308 disposed on the lasts 1304, 1306 can be a left-right pair (e.g., articles that are the same style, color, and/or size). In other embodiments, the article on the last 1304 and the article on the last 1306 can be different styles, colors, and/or sizes. Regardless, the system can be configured to locate one or more fiducial markers on the print bed and/or on one or more of the article, and the printing device can print one or more graphics on both of the articles.

Figure 14:
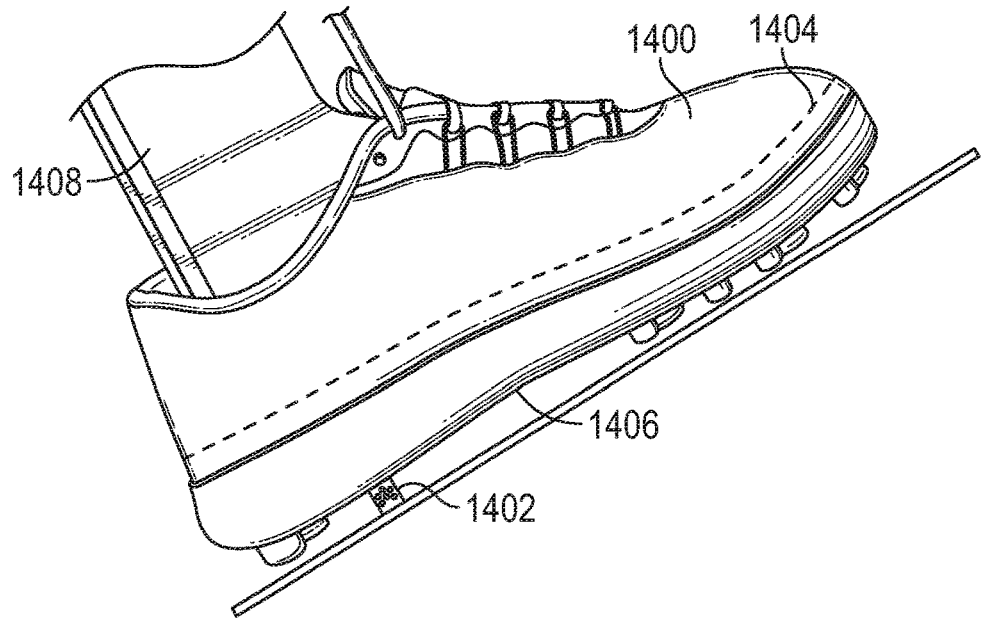
FIG. 14 depicts another exemplary embodiment of a fiducial marker.

In another embodiment, an article can be placed into the system in the same position relative to an initial position of a fiducial marker each time. The fiducial marker can then be moved from the initial position to a second position contacting the article. Based on the change of position between the initial position and the second position, the system can determine one or more characteristics of the article. For example, referring to FIG. 14, the article 1400 can be placed on a stationary last 1408. The fiducial marker 1402 can be disposed in an initial position, which is known by the system 100 and which is spaced from the last 1408 by a first distance which is also known by the system 100. The fiducial marker 1402, which can be attached to a movable support member (e.g., an arm or post), can then be moved from the initial position to a position in which the fiducial marker 1402 contacts the article (e.g., the sole plate 1406 of the article). The system can then determine the distance the fiducial marker has moved from the initial position to the second position. Based on a determined distance the fiducial marker 1402 moved from the first position to the second position, the system 100 can, for example, determine a thickness between an inside of a sockliner 1404 of the article 1400 and an outside of the sole plate 1406 of the article 1400 by determining the distance between the fiducial marker 1402 and the last 1408. Based on the determined thickness, the system 100 can, for example, identify certain other parameters (e.g., model and/or size) of the article 1400 which correspond to the determined thickness.

In some embodiments, the system 100 can be configured with movable members such that a fiducial marker and an article can move relative to each other to align a height or z-coordinate of the fiducial marker in the same plane as a height or z-coordinate of the article. This can be accomplished in various ways.

Figure 15:
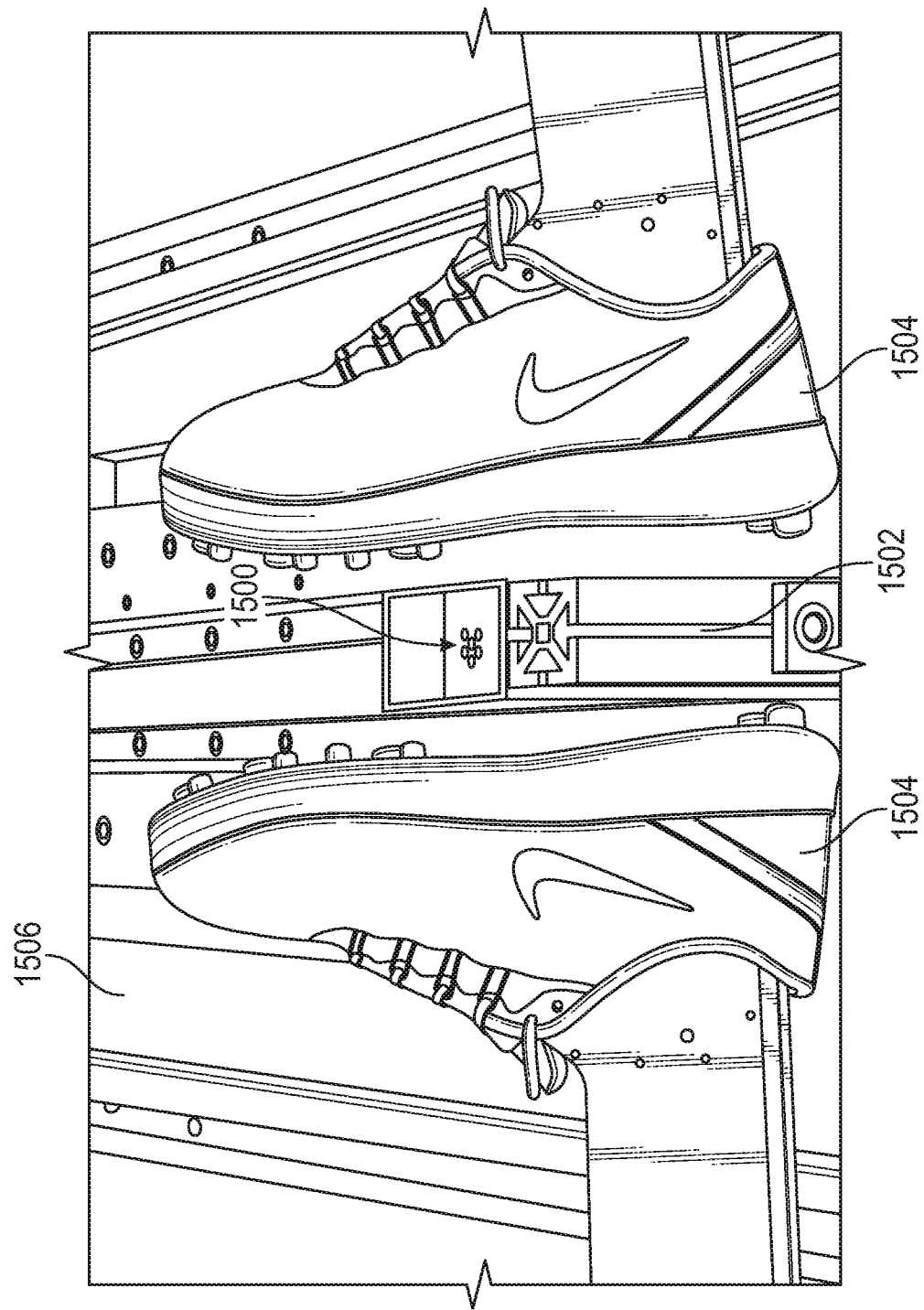
FIG. 15 depicts an exemplary device for positioning a fiducial marker.

For example, in particular embodiments, a fiducial marker 1500 can be attached to a fiducial support member 1502 (e.g., a post, a rod, a bar, a strut, etc.), as shown in FIG. 15. The fiducial support member 1502 can move in a height or z-direction (e.g., into and out of the plane of the page as illustrated in FIG. 15) relative to a last on which an article 1504 is disposed. In some embodiments, the fiducial support member 1502 can have a reset configuration in which a surface of the fiducial support member 1502 (e.g., a surface on which the fiducial marker 1500 is disposed) protrudes upwardly beyond an uppermost surface of the article 1504. The fiducial support member 1502 can be moved from the reset configuration to a set configuration in which the surface of the fiducial support member 1502 is aligned (e.g., in the same plane) with the uppermost surface of the article 1504. The fiducial support member 1502 can be moved from the reset configuration to the set configuration by pressing the fiducial support member 1502 downwardly (e.g., with a plate).

The fiducial support member 1502 can be selectively locked in place with a locking mechanism. For example, the locking mechanism can comprise a biasing element (e.g., a spring) that biases the fiducial support member to the reset configuration and a retaining mechanism (e.g., teeth and grooves) that secures the fiducial support member in the set configuration. In particular embodiments, the locking mechanism can be configured to operate in a manner similar to that of a "clickable" retractable pen. Once the article 1504 is processed, the fiducial support member 1502 can be moved from the set configuration to the reset configuration. This can be accomplished automatically or manually.

In other embodiments, a last and/or an article support member 1506 to which the last is coupled (e.g., a print bed) can be movable, and the fiducial support member 1502 can be fixed. For example, the system 100 can comprise a sensor device (e.g., the senses laser light and/or electrical or magnetic fields) with sensors that determine a height or z-coordinate of the article 1504. The system 100 can include one or more motors, actuators, and/or other mechanisms for adjusting the article support member 1506 such that the uppermost portion of the article 1504 is aligned (e.g., in the same plane) with the fiducial marker 1500.

In another exemplary embodiment, a grid can be formed on the last in the ankle region of the last. The grid can be visible on a portion of the last that extends up out of the mouth of the article. The appearance of the grid can vary along the height of the last such that the grid can be used to identify the collar portion of the article as a fiducial. The fiducial can be used to provide a point of reference for the output device.

In other embodiments, a light source (e.g., a light-emitting diode ("LED")) or a laser (e.g., a UV laser) can generate a fiducial. For example, a light source can be placed behind and/or within an interior portion of the article to "backlight" the article such that the light or a pattern created by the light source is visible to the image sensor 106 through the article. The system 100 can detect and locate the light and use the image projected onto the article as a fiducial. In other embodiments, a light source can be used to display a fiducial on the exterior surface of the article. This can be accomplished, for example, by shining the light directly onto the exterior surface of the article. The system 100 can detect and locate the reflected light and use the received image as the fiducial.

In short, a fiducial can be any consistent, repeatable feature that is visible to an image sensor and can be utilized by the system prior, during, and/or after assembly of an article.

In some embodiments, multiple fiducials can be used to one or more of several beneficial ends. For example, the article can have a first fiducial marker (e.g., a logo), and the workspace of the output device can have a second fiducial marker (e.g., coupled to a last). In some embodiments, the system 100 can search for the first fiducial marker (e.g., a logo), and if the first fiducial is not found, the system 100 can use the second fiducial marker.

In other embodiments, multiple fiducials can be used to provide scale (e.g., size) of the article. This can be accomplished, for example, by determining the relationship (e.g., distance, offset, rotation) of a first fiducial relative to one or more other fiducials. For example, an article can have a first fiducial located toward a toe portion of the article and a second fiducial located toward the heel portion of the article. The system 100 can identify the first and second fiducials and measure a distance and/or angle between the first and second fiducials. The system 100 can use the distance and/or angle, for example, to determine the size of the article and/or the orientation of the article relative to the output device 104.

Figure 16:
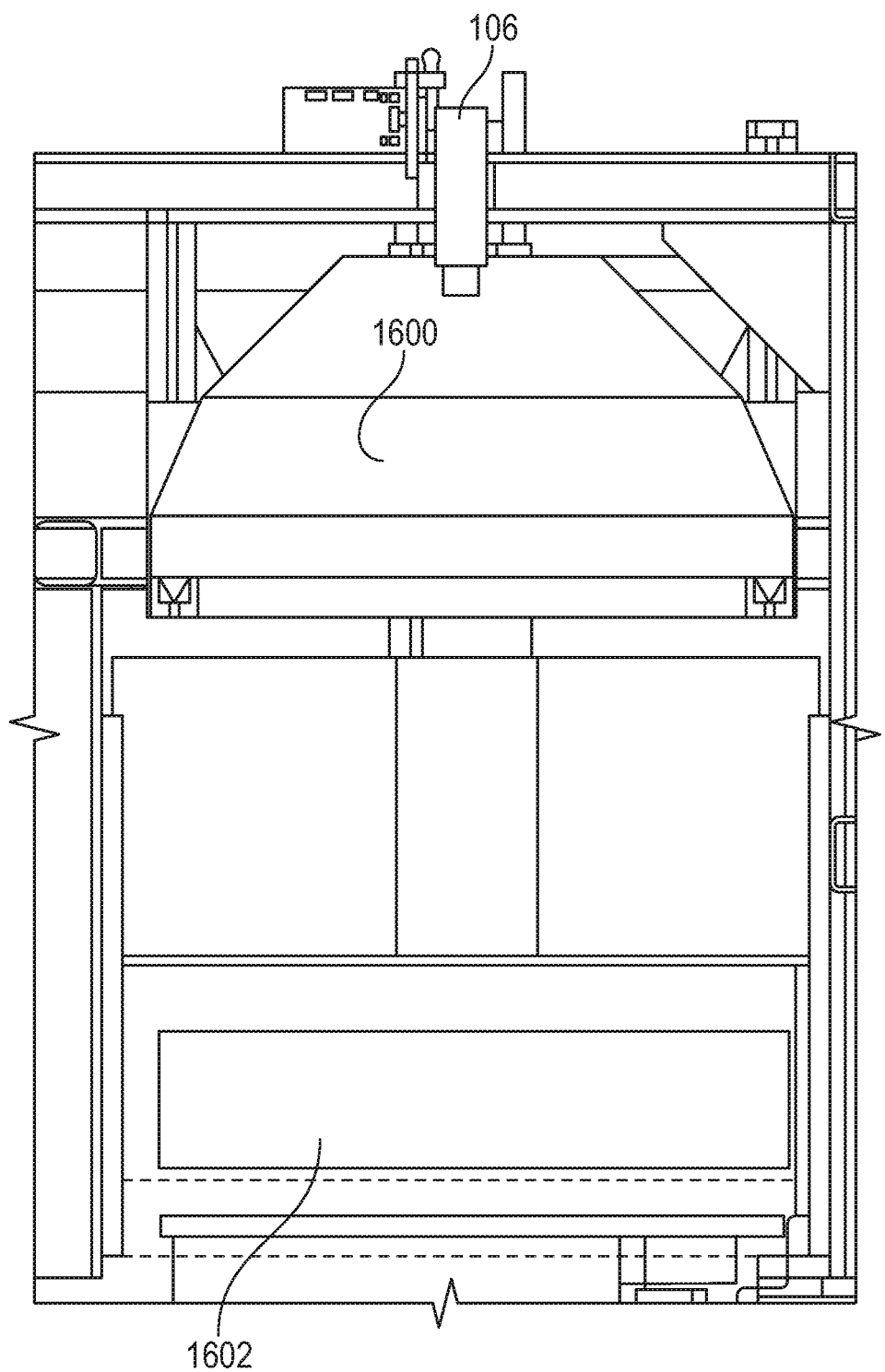
FIG. 16 depicts an exemplary embodiment of a printing system.

In some embodiments, contrast that is available along the surface of the article can be increased by lighting to facilitate the identification of a fiducial. In certain embodiments, various lighting types (e.g., LED, UV, etc.) and/or lighting locations (e.g., side lighting, back lighting, etc.) can be provided. In certain embodiments, the system 100 can comprise a diffusion dome 1600 with high-brightness LED lighting coupled to the image sensor 106 and disposed above the print bed 1602, as shown in FIG. 16. The diffusion dome 1600 can be used to vary the lighting conditions. Varying the lighting conditions can, for example, improve the system's ability to locate a fiducial, for example, by providing increased image contrast.

In lieu of or in addition to the lasts mentioned herein, in an exemplary embodiment, one or more of the holding assemblies (e.g., lasts) and/or methods described in U.S. Pat. Nos. 9,301,576 and 9,456,651, which are incorporated by reference herein, can be used to support an article of footwear. Various other types of last, jigs, holding assemblies, etc. can be used to hold other types of articles.

Region of Interest Modules

When creating a shape model and/or locating a fiducial (as explained above), the system 100 can determine a region of interest ("ROI") in the image of the article. The ROI can contain the object to be used (e.g., the logo) for creating the shape model. In some embodiments, the ROI can be a portion of the image in which a fiducial is disposed.

When determining the region of interest ("ROI") (e.g., 608 in FIG. 6), the system 100 can use one or more of various types of imaging modules to reduce or eliminate noise from the image, and/or to more clearly define edges around the target shape (e.g., a fiducial on or adjacent the article). To limit the extraction to just the desired edges, an ROI can be specified around the target shape. Once an ROI is generated, the system 100 can begin extracting and displaying the edges of the target shape. To enhance and/or clarify the extracted target edges, the user can modify the view of the model image.

The ROI can be generated automatically, manually, or via a combination of both. The system 100 can comprise various tools, modules, and/or components for improving the quality of the ROI. This can, for example, reduce the time and/or improve the consistency in which the system 100 can locate a fiducial and/or generate or utilize a shape model.

In some embodiments, the system 100 can include various imaging tools, modules, and/or components for filtering the generated images. For example, in one embodiment, the system 100 can include modules for adjusting the view of the model image, such as choosing filter or "gray" options, adjusting the amount of smoothing, and/or adjusting the gray windowing. The ROI can be adjusted, for example, to eliminate undesired edges.

Figure 17:
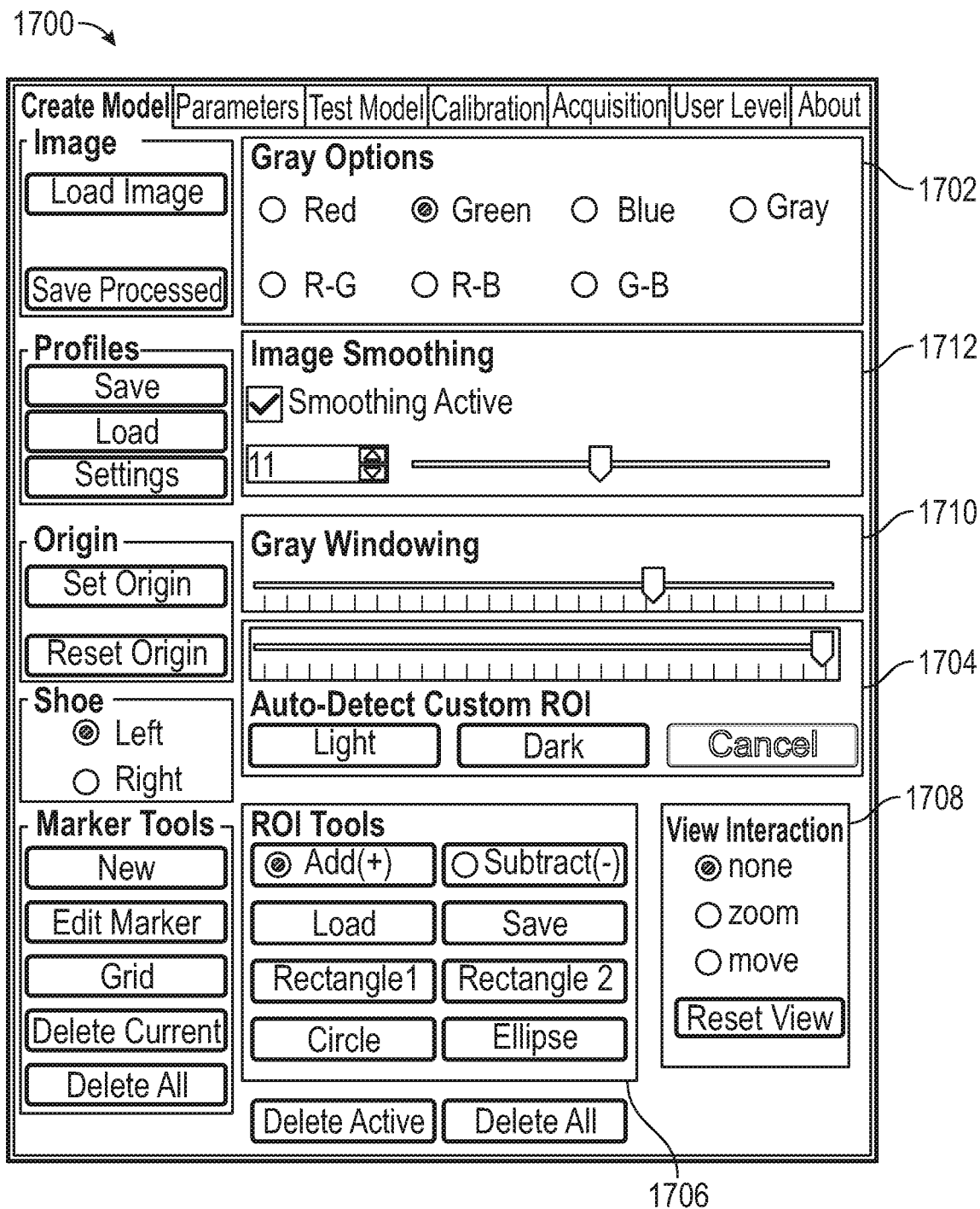
FIG. 17 depicts a screenshot illustrating exemplary modules for generating a shape model profile.

FIG. 17 shows an exemplary user interface 1700 (e.g., a graphical user interface, or "GUI") displaying exemplary modules for eliminating noise from the image. One or more features of the user interface are identified herein by a specific terms shown in FIG. 17 (e.g., "Load Image," "Set Origin," etc.), and may be understood to correspond to one or more of an executable function/action, and a set of machine executable instructions stored on a data storage medium and corresponding to the function. Functions can include user-selectable actions, or user-selectable conditions used relative to performing one or more actions. Such functions, when selected, can solely influence or cause an operation of computing device executing coded instructions, or can also influence or cause a physical action by a printing device. However, the specific terms shown in the GUI of FIG. 17, and in other GUIs of the invented embodiments shown in the several drawing figures, should be recognized as being illustrative and exemplary of such features, and not limiting the embodiments to the specific appearance of the depicted GUIs, nor limiting the exact functions corresponding to such specifically depicted terms. For example, a feature identified by the term "Save" in the "Profiles" portion of the GUI in FIG. 17 could alternatively be identified by another term, such as "Store," or "Retain," while nevertheless corresponding to the same function. Alternatively, the "Save" feature in the "Profiles" portion could alternatively cause a profile to be saved to one location in one embodiment (e.g., a cloud-based storage location), or another location in a different embodiment (e.g., a local hard drive). Therefore, the specific terms used in the depicted GUIs and referenced in the included descriptions are exemplary rather than exclusive as to the contemplated embodiments.

The modules can include one or more of a gray options module 1702, an auto-detect custom ROI module 1704, an ROI tools module 1706, a view interaction module 1708, a gray windowing module 1710, and an image smoothing module 1712.

A gray scale image can be extracted from a color image in various ways. For example, an image can comprise red, green, and blue color channels. In particular embodiments, the system 100 can generate a gray filter by combining the red, green, and blue channels using a formula of 0.299*red+0.587*green+0.114*blue to combine three color intensity values of a pixel into a single gray scale pixel. In some embodiments, the system 100 can generate various other filters such as Red-Green ("R-G"), Red-Blue ("R-B"), and Green-Blue ("G-B").

Depending on the selected filter (e.g., gray, R-G, R-B, G-B), the desired edges can be obscured, enhanced, or, in some cases, simplified to show a consistent dark-light polarity. The selected filter can, for example, also help to reduce background noise. A user can utilize different options to determine which filter best highlights just the desired edges of the target shape. The filter can be changed later if desired (e.g., after the ROI is generated and the extracted edges are visible).

The system 100 can be configured with the auto-detect custom ROI module 1704. If the object (e.g., the logo) is darker than the background of the article, the user can select "Dark." With other articles, for example, the user can select "Light." In some embodiments, selecting either button can put the system 100 into auto-detect mode which shows all the auto-detected shapes. Clicking on the desired shape can select the desired shape, exit auto-detect mode, and/or generate a custom ROI just outside of the shape. To exit auto-detection mode without selecting a shape, the user can select "Cancel."

In some cases, the initially detected shapes may not be as well defined as desired. If this happens, the image refinement modules (such as the gray options module 1702, the image smoothing module 1712, and/or the gray windowing module 1710) can be adjusted during the detection process to improve the result. Additional details about the image smoothing module 1712 and the gray windowing module 1710 are provided below.

As mentioned above, an ROI can be manually selected by a user. For example, if the target shape is too complex, is incomplete, and/or if there are interfering features on the article that prevent the auto-detect custom ROI module 1704 from isolating the target shape as needed, a user can utilize the ROI tools module 1706. The ROI tools module 1706 can, for example, be used to move and/or resize the ROI.

The ROI tools module 1706 can include boundary generation tools and controls to remove, receive, and/or store them. In some embodiments, the boundary generation tools can include Rectangle 1, Rectangle 2, Circle, and/or Ellipse.

In particular embodiments, Rectangle 1 can be a boundary box that can be resized with a control point at the corners and moved with the control point at the center. In some embodiments, Rectangle 1 cannot be rotated.

In certain embodiments, Rectangle 2 can be a boundary box that can be rotated using the control point on the arrow. In some embodiments, Rectangle 2 can also be resized and moved.

In particular embodiments, Circle can be a circular boundary that can be moved by the center and resized by the edge point.

In certain embodiments, Ellipse can be an elliptical boundary that can be rotated using the control point on the arrow and be resized using the edge points.

In some embodiments, the ROI tools module 1706 can be used alone or in various combinations to build up the ROI manually.

As shapes curve away from the image sensor due to variation in surface height of the article (e.g., near a side of the article), the shape may become distorted. This distortion can be different for various orientations of the article. In addition, the lighting may be more oblique in these areas, which can give the edges different characteristics. To reduce distortion, a user can "clip off" the part of the ROI that is closest to the falling edge of the article using a negative ROI. In some embodiments, a model that uses the clearer, flatter parts of the target shape can perform better during the recognition phase than one that includes all the edges. In some embodiments, the contour generated by the system 100 during recognition can fill in the excluded edges.

In some embodiments, regions can be added to or subtracted from the ROI by selecting a region and then clicking the Add (+) or Subtract (−) option. In particular embodiments, positive(+) regions can be displayed on the display 108 with a first color boundary line and negative(−) regions can be displayed one the display 108 with a second color boundary line. The system 100 can generate the final ROI by combining all of the positive(+) regions and removing all of the negative(−) regions. The final ROI can be displayed on the display 108 with a third color boundary.

In some embodiments, ROIs can be saved to a storage medium by selecting "Save" on the ROI module group and selecting a file name in a dialog box. A stored ROI can be received for reuse by selecting "Load."

The view interaction module 1708 can be used, for example, to examine the extracted edges of the target object. For example, once the ROI is generated, the edges can be automatically extracted with the current settings and displayed in a first color. In some embodiments, the best edges for a model can be simple lines. To improve the edge extraction, a user can utilize the gray windowing module 1710 and/or the image smoothing module 1712. To facilitation examination of the edges, the view interaction module 1708 can include options for zooming and/or moving the image with an input device (e.g., a mouse, keyboard, microphone, button, pedal, and/or touchscreen, etc.).

The gray windowing module 1710 can have one or more adjustment members (e.g., two "sliders" as shown in FIG. 17). A first adjustment member can control the darkest gray level allowed in the working image. The first adjustment member can have a default position (e.g., all the way to the left). A second adjustment member can control the lightest gray level allowed in the working image. The second adjustment member can have a default position (e.g., all the way to the right). In some images, the background outside the shape can comprise a mixture of gray values. In some images, the interior of the shape is not uniform. This can, in certain embodiments, make the edges uncertain, resulting in poorly defined edges that have many intertwined lines and segments. In some embodiments, the gray windowing module 1710 can, optionally, convert all pixels that are below a lower limit to the lower limit and all pixels above an upper limit to the upper limit, thus leaving only the gray values that include the edge transition of interest.

In some embodiments, the user can adjust the first adjustment member until the dark part of the image is as uniform as possible at the edges of the shape. The user can adjust the second adjustment member until the light part of the image is as uniform as possible at the edges of the shape. While doing this, the contour line can get smoother and simpler. This can, for example, improve the matching ability of the model and/or speed up the finding process.

The image smoothing module 1712 can be used, for example, to remove irrelevant detail from noisy images. In some embodiments, the edge detection can be very sensitive. This sensitivity can, in some cases, pick up unwanted edges on the unmodified model image. In some embodiments, a slider and/or a numerical control can define the level of smoothing (e.g., higher numbers can correspond to more smoothing). The default level can be selected. If too much detail has been removed from a model image and there is little detail that complicates the edges of the target shape, smoothing can be reduced to catch weaker edges. In images with a great deal of interfering texture or with small narrow objects that touch the shape, smoothing can be increased to avoid unwanted edges.

Once the ROI is determined, the system 100 can define an origin. In some embodiments, the origin can be the geometric center of the ROI. In other embodiments, the origin can be moved to a specific place on the shape or some other feature. The origin can be used, for example, as a point of reference relative to which a graphic marker can be placed and/or with which the output device 104 can be aligned.

Figure 18:
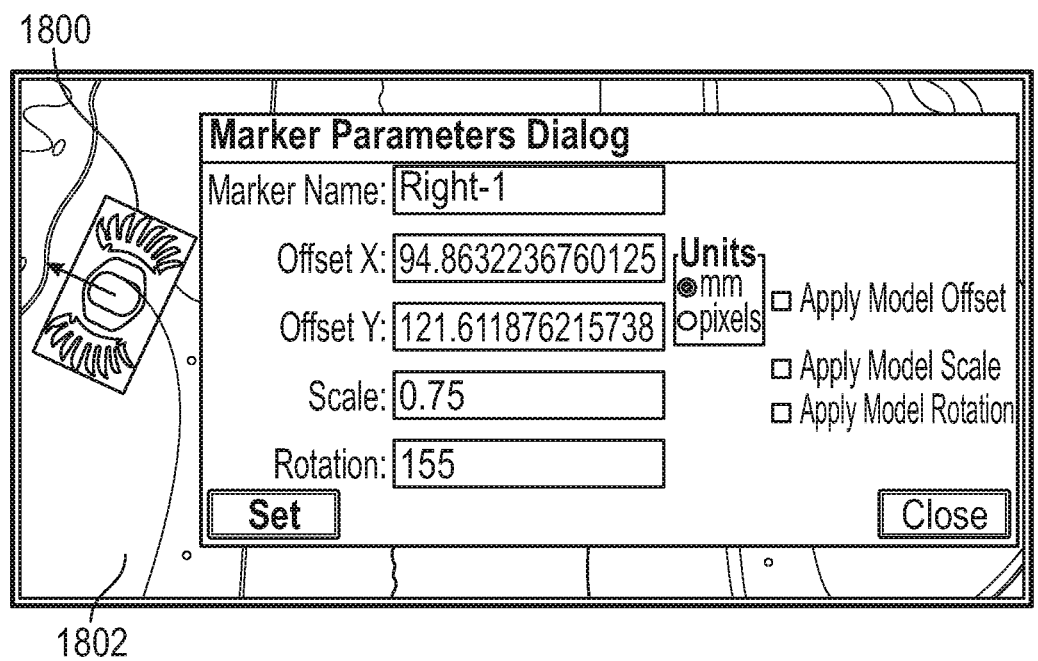
FIG. 18 depicts a screenshot illustrating other exemplary modules for generating a shape model profile.

A graphic marker is a graphical user object that defines a location, scaling, and/or orientation of a graphic to be placed (e.g., printed) on the article. In some embodiments, a graphic marker can be generated by receiving the desired graphic from an image file (e.g., .jpg, .tiff, .gif, etc.) or from a Microsoft Word (.doc) or an Adobe portable document format (.pdf) file. The graphic marker can be positioned relative to the image of the article. For example, FIG. 18 shows a graphic marker 1800 which is positioned on an image of an article 1802.

In some embodiments, the graphic marker 1800 can be resized, moved, and/or rotated as desired. In certain embodiments, the graphic marker 1800 can be offset, scaled, and/or rotated based on a detected shape model. For example, if a target shape is found in a rotated position, the graphic marker offsets can reflect this change in the X and Y distances (e.g., trigonometrically).

This process can, for example, improve the consistency and efficiency of the through-put because the system can, for example, position and/or size the graphic marker automatically regardless of a size or position of the article in the print bed.

In other embodiments, the graphic marker 1800 can be sized and/or oriented independent of the shape model. This can, for example, cause a location (e.g., X and Y offsets) of the graphic marker 1800 to be displaced from a new origin but reflect the original orientation of the marker.

Figure 19:
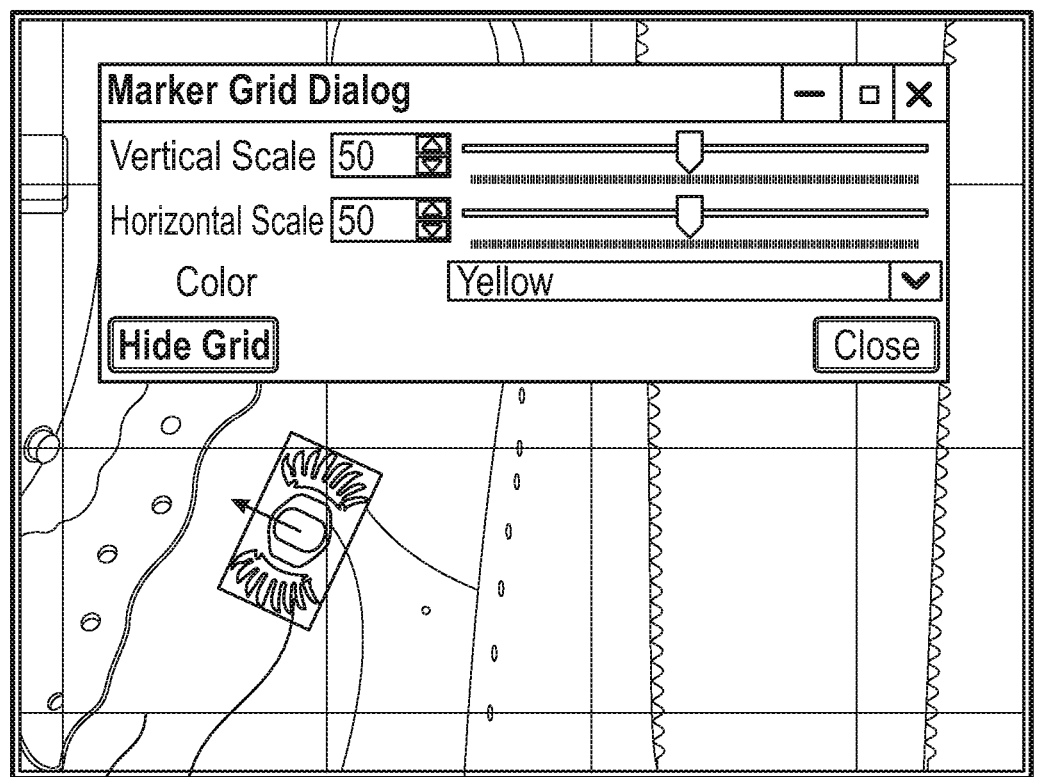
FIG. 19 depicts a screenshot illustrating other exemplary modules for generating a shape model profile.

As shown in FIG. 19, in some embodiments, a grid 1900 can be displayed over the image. The grid 1900 can facilitate positioning and/or alignment of a graphic marker 1902. As shown, in some embodiments, the system 100 can comprise a "Marker Grid Dialog" interface to allow the configuration of the grid to be changed in various ways (e.g., horizontal and vertical scale, color, etc.).

In some embodiments, the system 100 can identify an outline of a target shape (e.g., the edge of a logo). The system 100 can then print a graphic on the outline of the target shape.

In some embodiments, the settings and one or more graphic markers can be stored as a profile. The profile can be written to storage (e.g., as an .xml file). In some embodiments, while saving the profile an additional file containing the shape model can be stored.

With respect to articles of footwear and other articles comprising more than one article (e.g., a left article and a right article), separate profiles can be generated and stored for each article (e.g., a left profile and a right profile).

Figure 20:
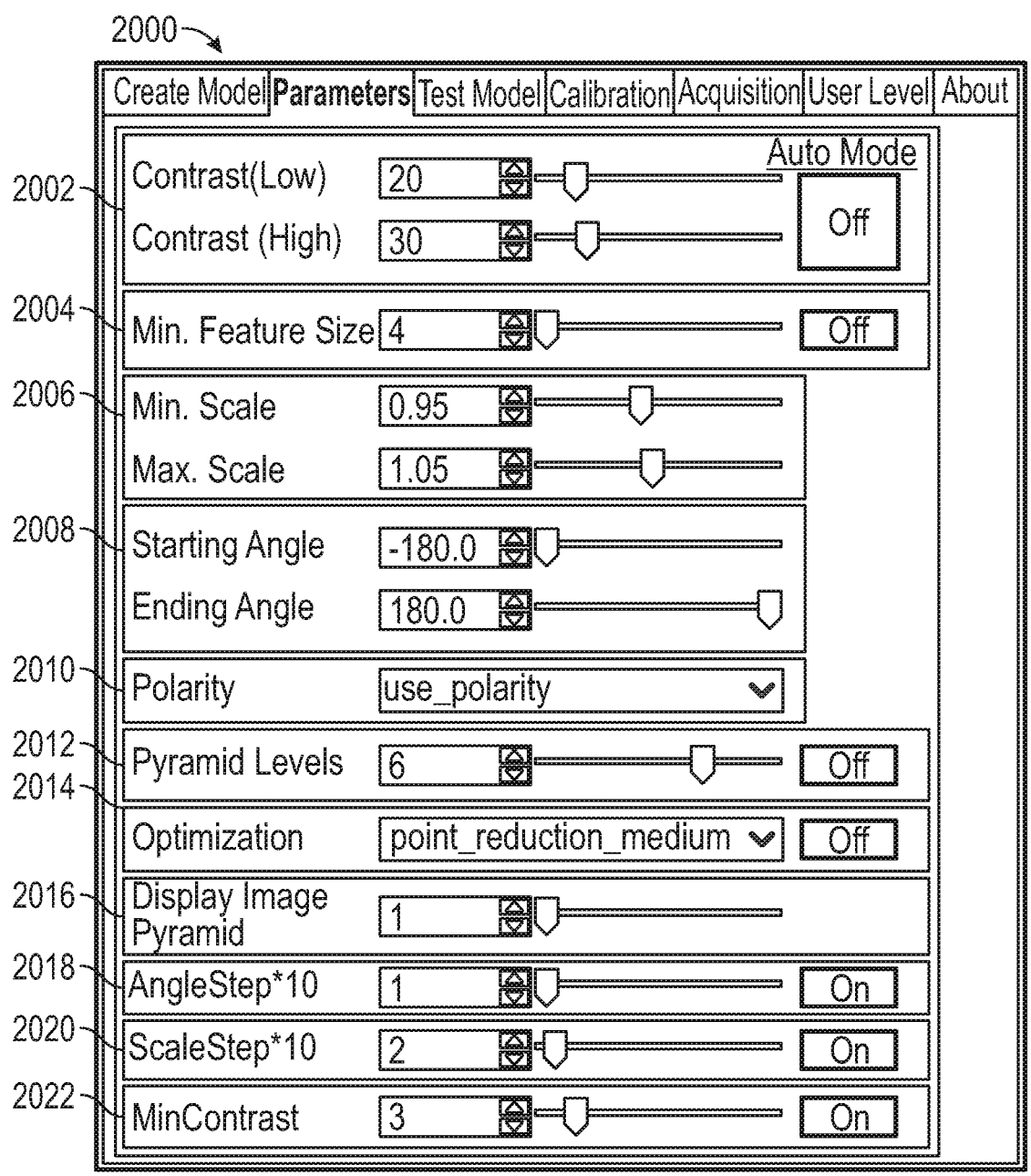
FIG. 20 depicts a screenshot illustrating other exemplary modules for generating a shape model profile.

As shown in FIG. 20, in some embodiments, the system 100 can comprise additional modules 2000 to further define edges of ROI of the shape model. These modules can be adjusted to achieve the desired accuracy and/or speed with which the system identifies the target shape in the image of the article. The modules 2000 can include one or more of a contrast module 2002, a minimum feature size module 2004, a scale range module 2006, an angle range module 2008, a polarity module 2010, a pyramid levels module 2012, an optimization module 2014, a display image pyramid module 2016, an angle step module 2018, a scale step module 2020, and a minimum contrast module 2022. Each of these modules 2000 is further described below.

The contrast module 2002 can be used, for example, to improve edge detection of the target shape (e.g., a logo). If the edges are incomplete, low contrast can be lowered until edges are clear and visible. If unwanted edges persist, the low contrast or high contrast can be raised. Changes to the contrast can interact with smoothing and gray windowing. The contrast module can have an "Auto Mode" in which the system 100 can automatically select an appropriate value as the ROI and image view changes. Manually changing the settings while Auto Mode is "On" can automatically turn off Auto Mode.

The minimum feature size module 2004 can be used, for example, if edges persist around small objects in or around the target shape, such as those from patterns in the textile and/or a graphic. These unwanted edges can be eliminated by increasing the value of the minimum feature size module 2004. If doing so also removes small segments of the edges from the target shape, this may indicate that gray windowing needs to be adjusted. In certain instances, where strings or other objects cross the edges of the target shape or create interior sub-shapes, small negative ROIs can be used to cut these features out of the model. It should be noted that it is not necessary to include all the edges in the model for it to work well. The minimum feature size module 2004 can have an "Auto Mode" in which the system 100 can automatically select an appropriate value as the ROI and image view changes. In some embodiments, manually changing the settings while Auto Mode is "On" for these settings can turn off Auto Mode.

The scale range module 2006 can be used, for example, if there are artifacts (e.g., graphics, characteristics, etc.) on the article that are similar enough to the target shape and also of a size that fall inside scale limits. The maximum and minimum scale limits can be adjusted to eliminate these artifacts.

The angle range module 2008 can be used, for example, to find the desired target object when it is one of multiple symmetrical objects found in the image. In embodiments where the left and right versions of the graphics are mirror images of each other, this is typically not an issue. If a symmetrical graphic shape is used, however, the angle range module 2008 can be adjusted to limit the angle to avoid finding the wrong one. The starting and ending angles can be adjusted until only the desired target shape is found.

The polarity module 2010 can be used, for example, to determine whether the gray values at the edge of the target shape transition from light to dark or from dark to light. This can include various functions such as "use_polarity," "ignore_global_polarity," and "ignore_local_polarity." The functions identified herein by a specific term (e.g., "use_polarity," "ignore_global_polarity," and "ignore_local_polarity," etc.) may be understood to correspond to one or more of an executable function/action, and a set of machine executable instructions stored on a data storage medium and corresponding to the function. Functions can include user-selectable actions, or user-selectable conditions used relative to performing one or more actions. Such functions, when selected, can solely influence or cause an operation of computing device executing coded instructions, or can also influence or cause a physical action by a computing device and/or a printing device. However, the specific terms, should be recognized as being illustrative and exemplary of such features, and not limiting the embodiments listed, nor limiting the exact functions corresponding to such specifically depicted terms. Therefore, the specific terms used are exemplary rather than exclusive as to the contemplated embodiments.

The use_polarity setting can, for example, increase the success of finding the shape model in the correct location, for example, when the target is dark (e.g., black) and surrounded by light (e.g., white), or vice versa. For use_polarity, the target shape in the image and the model can have the same contrast. If, for example, the target shape in a model based on a first article is a dark object on a bright background (e.g., black logo on a white background), the target shape in the image of a second article can be found if it is also darker than the background (e.g., blue logo on a yellow background).

The ignore_global_polarity setting can, for example, cause the search to examine all edges, regardless of polarity. This can result in slower searching but can be useful in particular circumstances where the target and background are the same or similar (e.g., black on black, white on white, etc.). For ignore_global_polarity, the target shape can be found in the image also if the contrast reverses globally (e.g., a model having a dark logo on a lighter background can also be used to find a lighter logo on a darker background).

The ignore_local_polarity can be used, for example, when the polarity in some areas differs from that in others. For example, if a target shape is partially bound by some transitions from dark to light and partially bound by some transitions from light to dark. For ignore_local_polarity, the model can be found even if the contrast changes locally. This option can, for example, be useful if the target shape consists of a part with medium gray value, within which either darker or brighter sub-objects lie.

In some embodiments, a search of the image for edges that fit the model can occur first at a very low resolution and then, if needed, increase by steps to finer resolutions to determine the fitness of found edges. The pyramid levels module 2012 can, for example, change the number of steps in the search. In certain cases (e.g., where the edges correspond to very fine detail), the number of steps can be increased. Reducing the number of steps can reduce search time but may decrease accuracy. The pyramid levels module 2012 can comprise and "Auto Mode" in which the system 100 can automatically select an appropriate value as the ROI and image view changes.

The optimization module 2014 can be used, for example, to adjust noise at the edges of the target. The model can be based (e.g., indirectly) on the detected edges. In some embodiments, the edges can sometimes be rather noisy, which can result in lots of changes in direction and/or short runs that depart from the main edge. In addition, the edges can contain more points than can be efficiently used by the system 100. Because of this, the contours of the edges can be smoothed internally. A "point_reduction_medium" setting (e.g., a default setting) can be used to balance accurate and efficient detection. A "point_reduction_high" setting can be used, for example, if the edges are very noisy and/or the search is taking a relatively long time. A "point_reduction_low" setting can be used, for example, if the number of shape model points is too low to detect the target. A "none" setting can be used to use all the points. The optimization module 2014 can comprise an "Auto Mode" in which the system 100 can automatically select an appropriate value as the ROI and image view changes.

The display image pyramid module 2016 can be used, for example, to display a specific image pyramid level. This can be useful, for example, for diagnostic purposes, such as for determining why target-shape detection is taking longer than expected.

The angle step module 2018 can, for example, determine how many degrees the model is rotated during matching (e.g., in tenths of a degree). Setting larger steps can result in faster matching but may be less accurate. In the illustrated embodiment, the units are displayed in 10 times the internal setting simply for convenience. As such, a setting of 1 equals 0.1 degree. In some embodiments, adjusting the "Starting Angle" and/or "Ending Angle" of the angle range module 2008 can cause this value to be recalculated. In some embodiments, the angle step module 2018 can go into effect if changed after the angle range module 2008 is changed. The angle step module 2018 can comprise an "Auto Mode" in which the system 100 can automatically select an appropriate value as the ROI and image view changes.

The scale step module 2020 can, for example, determine increments by which the system 100 steps through the scale range during matching. In the illustrated embodiment, the units are displayed in 1000 times the internal setting for convenience. In some embodiments, at a setting of 2 (i.e., 0.002), a scale range of 10 percent (0.95-1.05) will be stepped through in 50 steps of 0.002. If a small scale range is set and the model is not found at the right scaling, this value can be lowered (e.g., from 2 to 1). If scaling is not a significant factor for a particular model, a shorter matching duration may be seen with a larger step (e.g., 3 v. 2). The scale step module 2020 can comprise an "Auto Mode" in which the system 100 can automatically select an appropriate value as the ROI and image view changes.

The minimum contrast module 2022 can, for example, set the minimum contrast that defines an edge for it to be considered during matching. In certain cases (e.g., with very weak edges and/or significant interfering factors), adjusting the minimum contrast module 2022 can improve matching results. For example, the minimum contrast value of the minimum contrast module 2022 can be a few units less than the low contrast value of the contrast module 2002. The minimum contrast module 2022 can comprise an "Auto Mode" in which the system 100 can automatically select an appropriate value as the ROI and image view changes.

In some embodiments, the settings can stored as a profile. The profile can written to storage (e.g., as an .xml file). In some embodiments, an additional file containing the shape model can be stored while saving the profile.

Shape Model Testing

The system 100 can be used to test a shape model. In certain embodiments, the system 100 can test the shape model by trying to find the target shape (e.g., the fiducial) in images other than the one used to create the shape model, preferably several. Generally speaking, the more images tested, the more robust the shape model (also referred to as a "shape model profile" or "profile"). Exemplary methods for testing a profile are further described below.

In order to test a shape model, the system 100 can generate the shape model stored in SHM format and the profile file stored in XML format. The data described in the shape model can include, among other things, fiducial size, fiducial type, and/or fiducial location. The profile file can include an image file of an article that differs from the shape model in one or more of a size, style, color scheme, and/or other characteristic of the article. Additionally or alternatively, the system 100 can receive a previously generated model from various other sources such as storage and/or a network.

Images for testing the profile can be received from various sources. For example, one or more images can be received from the image sensor 106, storage, and/or a network.

Figure 21:
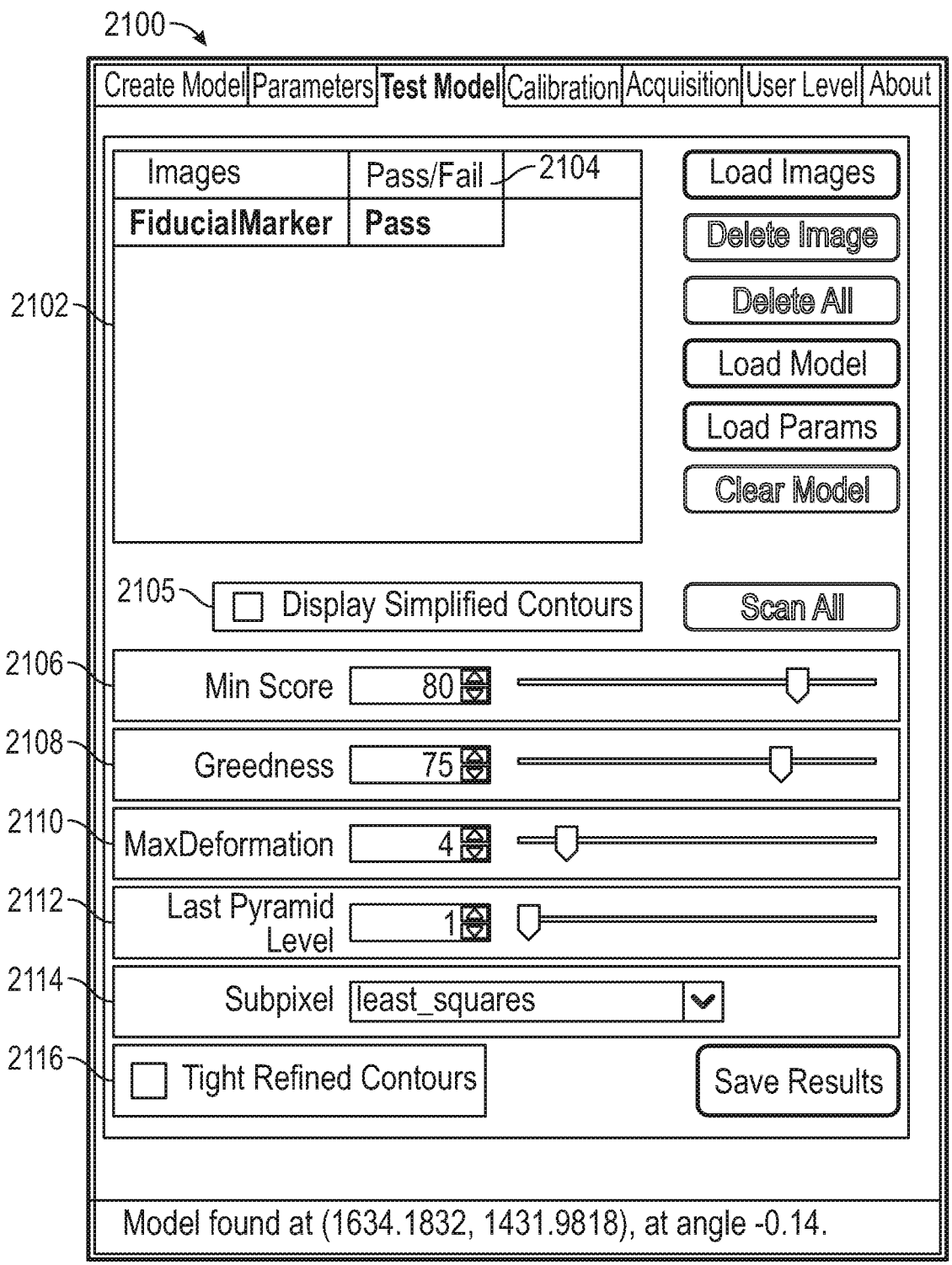
FIG. 21 depicts a screenshot illustrating other exemplary modules for generating a shape model profile.

FIG. 21 shows an exemplary user interface 2100 for testing profiles. The image file names can appear in the list box 2102 and a status column 2104 (e.g., Pass/Fail) can display the status of the received images. Initially, the status column 2104 can display "Untested."

An image name can be selected and the image can be scanned to detect the shape model. If the shape model is found in the image, the status column 2104 can display "Pass." If the test does not find the target shape, "Fail" is displayed in the status column 2104. The location and orientation can be displayed in an output window (not shown) on the display 108. The found model edges can, for example, be shown on the image (e.g., in a first color). Any graphic markers in the profile can be displayed in their relative position to the found target shape. The refined output contour, which can trace the entire edge of the target shape, can also be shown on the image (e.g., in a second color). In addition, an origin and orientation can be displayed. In some embodiments, all of the received images can be tested at once by selecting "Scan All."

A display simplified contours module 2105 can be used, for example, to identify differences in the model outline and the edges of the target shape in the images. For well-defined models such as those generated with careful gray windowing, there may be little difference with this option. In less robust models, the simplified display may show some discrepancy between the model and the target.

Refining the ROI can, in some embodiments, improve the profile. If, for example, unwanted contours are interfering with the matching process, the ROI can be edited to reduce or eliminate the unwanted contours. After editing the ROI, the test can be retried to determine if the image passes.

If, for example, the found edge diverges from the target shape near a falling curve of the article, negative ROIs can be added and/or adjusted to remove the edges near the falling curve.

If, for example, the found edge connects with the contrasting background surrounding the target, an appropriate refined edge can be generated. This can be accomplished, for example, by adjusting the ROI to keep it away from those curved areas and/or adjusting the gray windowing (e.g., with the gray windowing module 1710).

If undesired detail in the background and/or inside the target shape are picked up in the test images, modules (e.g., the gray options module 1702) may need to be changed and/or adjusted.

If one or more images still fail, one or more other modules can be utilized to see if the images can be made to pass. These modules can, for example, include a minimum score module 2106, a greediness module 2108, a maximum deformation module 2110, a last pyramid level module 2112, a subpixel module 2114, and a tight refined contours module 2116.

In some embodiments, the maximum deformation module 2110 can be adjusted first. The maximum deformation module 2110 can be used, for example, to adjust tolerance in which the accepted edges can drift from the model. For example, a value of 4 can allow the accepted edges to drift off the model edges by 4 pixels. If the deformation appears to be greater, the maximum deformation can be increased. In certain embodiments, it is preferable that the maximum deformation is not increased any further than necessary, as it can result in less accurate found edges. In some embodiments, increasing the maximum deformation too far can, for example, result in the system 100 finding the wrong shape or a failing score in images that had previously passed when the found shape is rejected because of other criteria.

The minimum score module 2106 can be used, for example, to adjust the percentage of the edges in the model must match for a target to pass. For example, in some embodiments, 80% can be a default value. In particular embodiments, settings as high as 98% will continue to pass with most models. However, in certain embodiments, a lower value can be used to achieve a more robust profile. Nevertheless, settings below 50% can, in some embodiments, result in unpredictable matches of parts of other shapes. In some embodiments, it can be advantageous to find the value at which all test images pass and set the minimum value a few points lower than that as a safety or buffer.

The greediness module 2108 can be used, for example, to determine the quantity of edge needed for a target to pass. If the model is defined with very few usable edges, lowering this value can help.

In some embodiments, shapes are searched for in increasingly finer resolutions in the image, starting with a reduced resolution version and working upward to speed up the search. The last pyramid level module 2112 can, for example, determine the level at which the search will stop. In certain embodiments, if the search is finding the target shape at a slightly lower level and then rejecting it at higher levels (e.g., due to excessive detail in the detected edges), stopping at a lower level by adjusting the pyramid levels module 2012 can, for example, allow the lower-resolution shape to pass. This setting can also be adjusted, for example, to decrease search time. In some embodiments, the levels can be ordered such that the lowest resolution is the first to be searched. In other embodiments, the highest resolution is the first to be searched.

The subpixel module 2114 can be changed to adjust subpixel accuracy. For example, in some embodiments, the search results can be set to return the position and orientation with a "least squares" subpixel accuracy. If, for example, increased accuracy in the found location is needed, a "least squares high" setting or "least squares very high" setting can be selected. In some embodiments, an "interpolation" setting or a "none" setting can be selected (e.g., if the search is taking too long). These settings may, however, result in lower accuracy in particular embodiments.

In certain embodiments, there can be other edges near the true edge of the target shape that can be picked up while refining and completing the contour of the target shape. This can, for example, result in the refined contour following the wrong edges. If this happens, the tight refined contours module 2116 can be selected. This can, for example, force the refined edges to be followed only very near the target shape.

The results can be stored, including the refined contour, in a format that is compatible with the format for output equipment (e.g., a printing device).

Image Sensor Calibration

To transform received and generated images into a real-world coordinate system, the system 100 can be used to generate a calibration of the image sensor 106 and/or the system 100 can receive a previously generated calibration (e.g., from storage and/or a network). Calibration can be used to determine the intrinsic camera parameters and the lens distortion. A calibration can be generated by inputting camera parameters, calibration images, and calibration parameters.

Camera parameters that can be input into the system 100 can include: focal length, sensor size X, sensor size Y, and image sensor type. In certain embodiments, for example, the focal length for telecentric lenses can be set to zero. The initial value can be the nominal focal length of the lens used (e.g., millimeters). For example, the sensor size X for pinhole cameras can correspond to the horizontal distance between two neighboring cells on the sensor. For telecentric cameras, the sensor size X can represent the horizontal size of a pixel in real-world coordinates (e.g., micrometers). For example, sensor size Y for pinhole cameras, can correspond to the vertical distance between two neighboring cells on the sensor. For telecentric cameras, the sensor size Y can represent the vertical size of a pixel in real-world coordinates (e.g., micrometers). An image sensor type can be specified (e.g., Area Scan Division).

Calibration images can be previously generated (e.g., with the image sensor 106 or another device), or they can be generated (e.g., with the image sensor 106) during the calibration procedure. In some embodiments, a plurality of calibration images (e.g., 1-25) can be used. In certain embodiments, 6-20 calibration images can be used. In an exemplary embodiment, 15 calibration images can be used.

Calibration parameters can include, rectified image width, rectified image height, calibrated scale (e.g., dots per inch ("DPI"), such as 300 DPI, and/or world pose index.

Once the calibration parameters have been entered and the calibration images have been generated or received, a calibration map can be stored. The calibration map and information file together can constitute the calibration. For example, a path and name can be used to store the calibration map and information files in the same location with different extensions. For example, in one or more embodiments, the calibration map can have a .tif file extension and the information file can have an .xml file extension.

The system 100 can also receive the calibration map and/or the information file. For example, the system 100 can receive the map and file from storage and/or a network.

The system 100 can test the calibration by receiving an image, rectifying the image, and storing the rectified image. The rectified image can apply the calibration map to the image. The image can be corrected for lens and parallax distortion and mapped to the specified calibration scale.

Image Acquisition

Image acquisition can be accomplished in various ways. The system 100 can acquire images from the image sensor 106 and/or from storage, a network, or other location. The acquired images can be used as model images, calibration images, and/or test images. In addition, if calibration images are going to be acquired during the calibration process an acquisition interface can be initialized by selecting an interface for a specific image sensor.

In some embodiments, an acquisition interface can be selected (e.g., from a dropdown list of all interfaces found on the system). In particular embodiments, one or more fields can be dependent on the selected acquisition interface and/or one or more fields can be independent from the selected acquisition interface.

In certain embodiments, fields can include horizontal resolution, vertical resolution, image width, image height, start row, start column, field, bits per channel, color space, generic, external trigger, image sensor type, device, port, line in, initialize, snap, start/stop live video, store, rectify image, auto gain, and/or other field.

In particular embodiments, horizontal resolution can include a real pixel value such as 800 or preset values, such as 1 for full resolution, 2 for half resolution, and 4 for quarter resolution.

In some embodiments, vertical resolution can include a real pixel value such as 600 or use preset values, such as 1 for full resolution, 2 for half resolution, and 4 for quarter resolution.

In particular embodiments, a desired width of the acquired image can be entered. This value can, for example, be less than or equal to the actual pixel width of the image sensor. In some embodiments, a preset value of 0 can be entered to use the full width. In some embodiments, the image width can be less than the actual pixel width of the image sensor. Accordingly, a column offset (e.g., from the left) can be set to correspond to the left of the desired image section.

In certain embodiments, a desired height of the acquired image can be entered. This value can, for example, be less than or equal to the actual pixel height of the image sensor. In some embodiments, a preset value of 0 can be entered to use the full height. In some embodiments, the image height can be less than the actual pixel height of the image sensor. As such, a row offset (e.g., from the top) can be set to correspond to the top of the desired image section.

In some embodiments, the acquisition interface can support interlaced and/or progressive fields.

In particular embodiments, the number of bits transferred per pixel per channel, e.g., 8 can be set.

In some embodiments, the desired color space of the acquired image can be set. For example, gray can be used in particular embodiments for single channel images. In other embodiments, Red-Green-Blue ("RGB") or luma-chroma ("$YC_BC_R$" sometimes referred to as "YUV") can be used for color images.

A generic field can be used in some embodiments for various available options specific to the selected acquisition interface.

An external trigger can be used in some embodiments to initiate the image acquisition.

The image sensor type can be selected in certain embodiments to search for a desired image file to be received when the image is generated.

In some embodiments, a device can be selected based on the selected interface. In particular embodiments, the device can have multiple output connections. A desired port for the selected device can be selected.

In certain embodiments, a multiplexor can be used to connect to multiple cameras. As such, a desired input line of the multiplexer can be selected.

In some embodiments, the initial parameters can be defined for the acquisition interface. If successful, the acquisition tools can be enabled. If not, a diagnostic message can be displayed in the output area.

In particular embodiments, snap can be set to receive and display a single image. In some embodiments, images can be streamed from an acquisition interface to the display 108.

A desired auto gain setting for the acquisition interface can be selected in some embodiments.

Example Computing System

Figure 22:
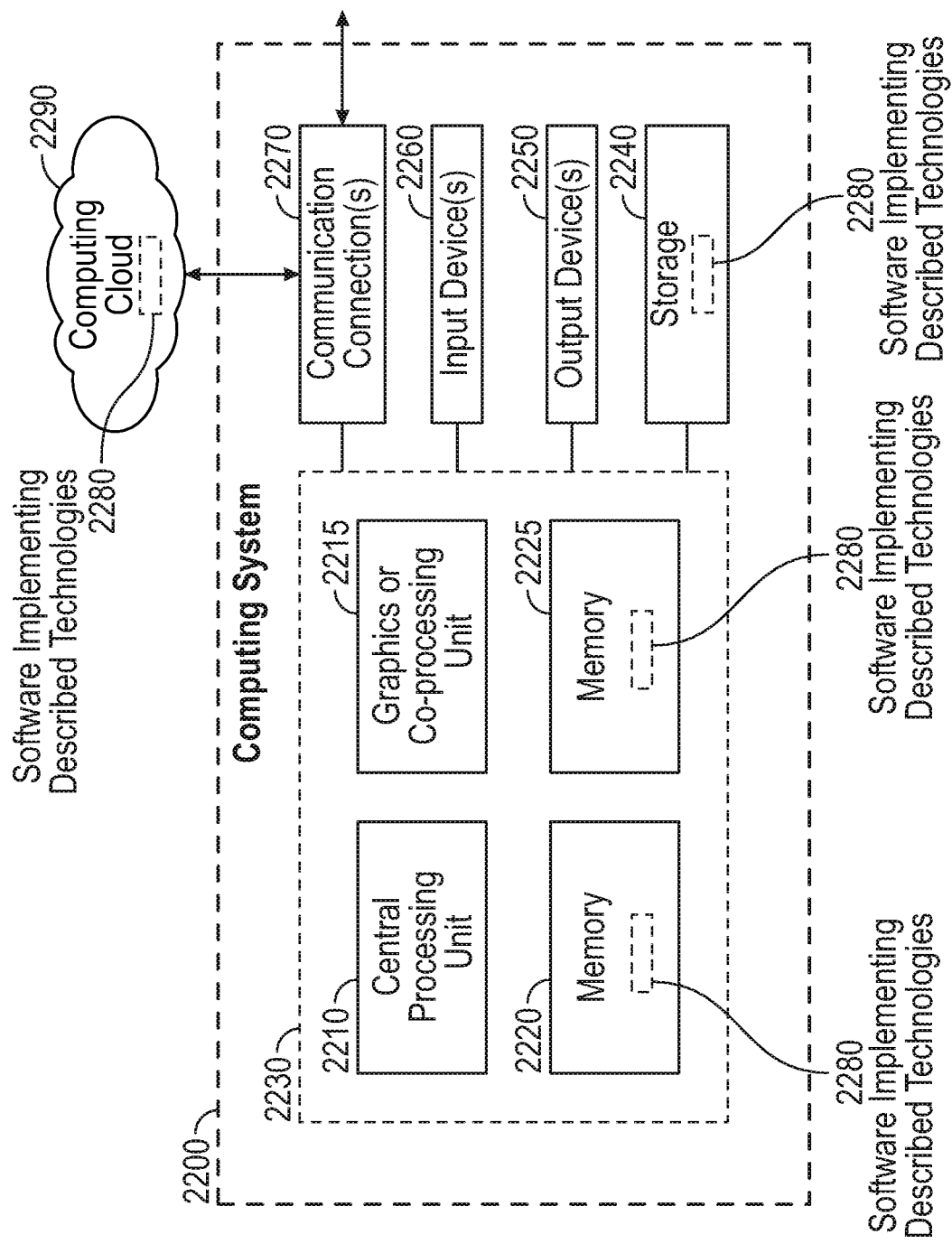
FIG. 22 depicts an exemplary computing system for implementing the disclosed technology.

FIG. 22 depicts a generalized example of a suitable computing system 2200 in which the described innovations may be implemented. The computing system 2200 is not intended to suggest any limitation as to scope of use or functionality, as the innovations may be implemented in diverse general-purpose or special-purpose computing systems. For example, the computing system 2200 can be used to implement hardware and software.

With reference to FIG. 22, the computing system 2200 includes one or more processing units 2210, 2215, non-volatile memory 2220, and memory 2225. In FIG. 22, this basic configuration 2230 is included within a dashed line. The processing units 2210, 2215 execute computer-executable instructions, including instructions for generating shape models, locating fiducials in images, and/or aligning an output device with an article as disclosed herein. A processing unit can be a general-purpose central processing unit ("CPU"), processor in an application-specific integrated circuit ("ASIC"), or any other type of processor. In a multi-processing system, multiple processing units execute computer-executable instructions to increase processing power. For example, FIG. 22 shows a central processing unit 2210 as well as a graphics processing unit ("GPU") or co-processing unit 2215. The tangible memory 2225 may be volatile memory (e.g., registers, cache, RAM), non-volatile memory (e.g., ROM, EEPROM, flash memory, etc.), or some combination of the two, accessible by the processing unit(s). The memory 2225 stores software 2280 implementing one or more innovations described herein, in the form of computer-executable instructions suitable for execution by the processing unit(s).

A computing system may have additional features. For example, the computing system 2200 includes storage 2240, one or more input devices 2250, one or more output devices 2260, and one or more communication connections 2270. An interconnection mechanism (not shown) such as a bus, controller, or network interconnects the components of the computing system 2200. Typically, operating system software (not shown) provides an operating environment for other software executing in the computing system 2200, and coordinates activities of the components of the computing system 2200.

The tangible storage 2240 may be removable or non-removable, and includes magnetic disks, magnetic tapes or cassettes, CD-ROMs, DVDs, or any other medium which can be used to store information and which can be accessed within the computing system 2200. The storage 2240 stores instructions for the software 2280 implementing one or more innovations described herein.

The input device(s) 2250 may be a touch input device such as a keyboard, mouse, pen, or trackball, a voice input device, a scanning device, microphone, button, pedal, or another device that provides input to the computing system 2200. For video encoding, the input device(s) 2250 may be a camera with an image sensor, video card, TV tuner card, or similar device that accepts video input in analog or digital form, or a CD-ROM, CD-RW, DVD, or Blu-Ray that reads video samples into the computing system 2200. The output device(s) 2260 may be a display, printer, speaker, CD-writer, or another device that provides output from the computing system 2200.

The communication connection(s) 2270 enable communication over a communication medium (e.g., a connecting network) to another computing entity. The communication medium conveys information such as computer-executable instructions, compressed graphics information, video, or other data in a modulated data signal. The communication connection(s) 1170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 2290. For example, disclosed computer-readable instructions can be executed by processors located in the computing environment 2230, or the disclosed computer-readable instructions can be executed on servers located in the computing cloud 2290.

Computer-readable media are any available media that can be accessed within a computing system 2200. By way of example, and not limitation, with the computing system 2200, computer-readable media include memory 2220 and/or storage 2240. As should be readily understood, the term computer-readable storage media includes the media for data storage such as memory 2220 and storage 2240, but does not include transmission media such as modulated data signals or other transitory signals.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

In some embodiments, the computing system 102 can be configured with components and/or functionality of computing system 2200.

Additional Examples of the Disclosed Technology

Additional examples of the disclosed subject matter are discussed herein in accordance with the examples discussed above.

Figure 23:
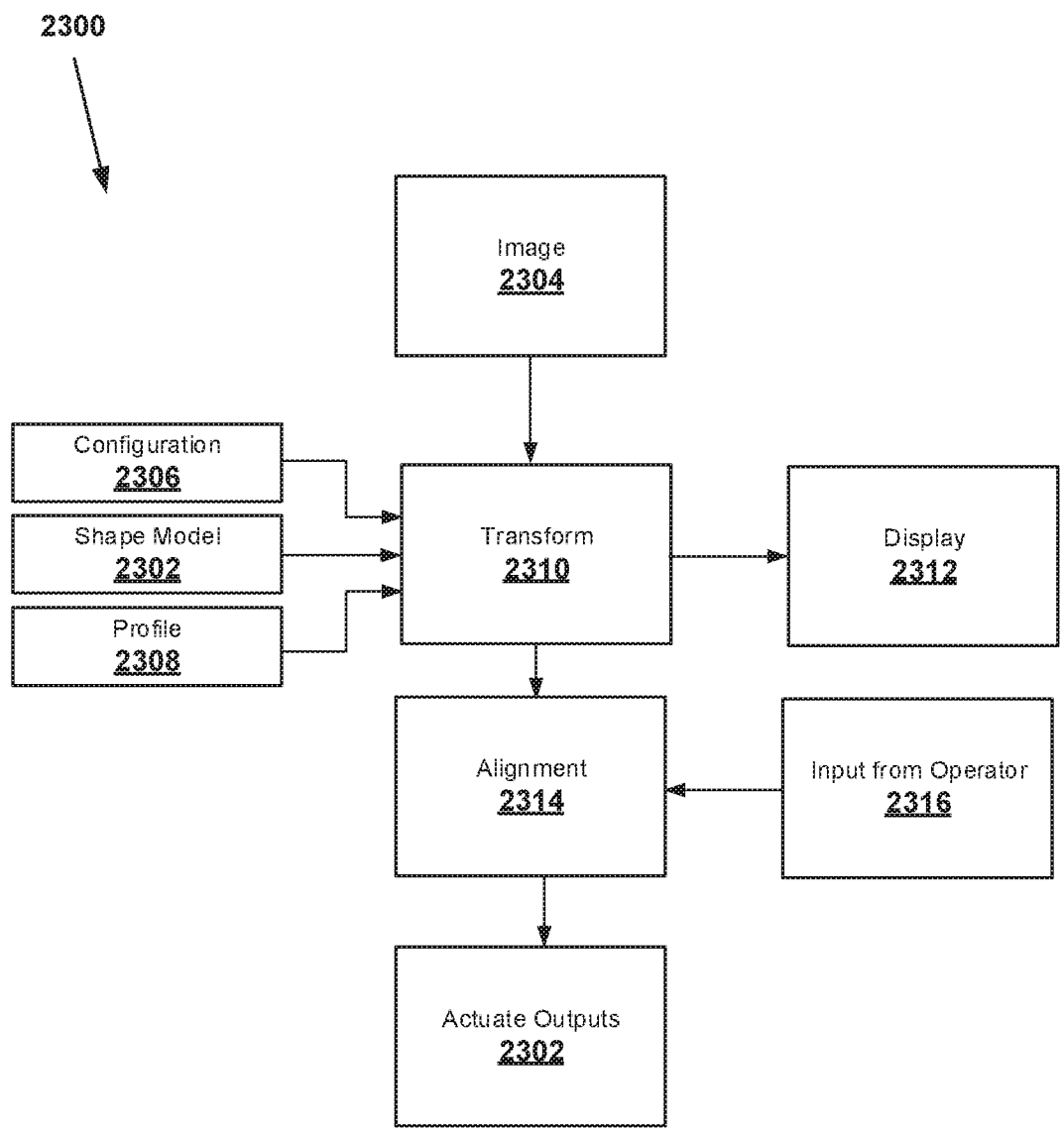
FIG. 23 depicts a flow chart outlining an exemplary method of using a shape model profile to print onto an article.

FIG. 23 depicts an exemplary method 2300 using a shape model profile to print onto an article. A system can generate an image (process block 2302) of the article. The system can provide a configuration file (process block 2304), the shape model (process block 2306, and/or the profile (process block 2308). The system can transform the image using the configuration file, the shape model, and/or the profile (process block 2310). The system can display the transformed image (process block 2312). The system can align the transformed image with the output device (process block 2314). The system can, optionally, receive input from the operator (process block 2316). The system can actuate outputs (process block 2318). The outputs can include printing a graphic image on an article.

Figure 24:
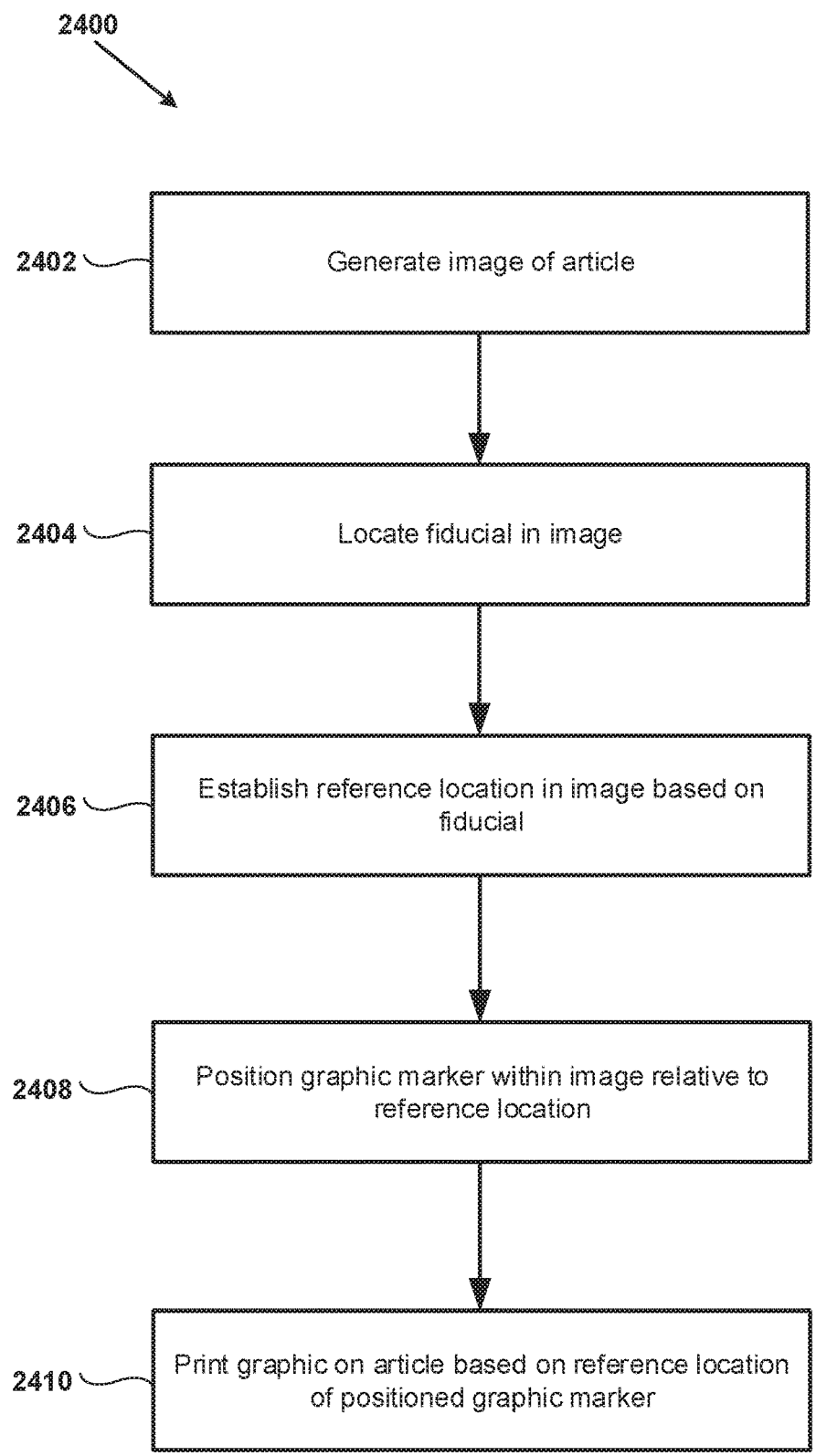
FIG. 24 depicts a flow chart outlining an exemplary method for printing onto an article.

FIG. 24 depicts an exemplary method 2400 for printing on an article. One or more steps of the method can be performed using a computer. The method 2400 can comprise generating an image of the article (process block 2402), locating a fiducial in an image of the article (process block 2404), using the fiducial to establish a reference location in the image (process block 2406), positioning a graphic marker within the image relative to the reference location (process block 2408), and printing on the article based on the location of the positioned graphic marker (process block 2410).

In some embodiments, the act of printing on the article is performed by a 2D printing device. In other embodiments, the act of printing on the article is performed by a 3D printing device.

In some embodiments, the article is a plurality of articles. In certain embodiments, the plurality of articles includes a first article and a second article. The first and second articles can have the same or similar characteristics (e.g., style, color, size, left-right, etc.). Alternatively, the first article can have one or more characteristics that are different than the corresponding characteristic of the second article.

In some embodiments, the method can further comprise generating an image of the article with an image sensor. In some embodiments, the method can further comprise generating an image of the article and a graphic.

In some embodiments, the method can further comprise receiving an image of the article. In some embodiments, the method can further comprise receiving an image of the article and a graphic.

In some embodiments, the fiducial comprises a logo disposed on the article. In some embodiments, the fiducial comprises an image printed on the article.

In some embodiments, the fiducial comprises a surface pattern of the article. In some embodiments, the surface pattern includes one or more lace eyelets. In some embodiments, the surface pattern includes one or more cleats. In some embodiments, the surface pattern includes a bite line contour. In some embodiments, the surface pattern includes one or more perforations.

In some embodiments, the fiducial comprises a pattern change in a knitted article. In some embodiments, the fiducial comprises a pattern change in a woven article. In some embodiments, the fiducial comprises locating pins of a loom.

In some embodiments, the fiducial is disposed on a sacrificial member that is coupled to the article during manufacturing and removed from the article after assembly.

In some embodiments, the fiducial is visible to the system only under certain lighting conditions. In some embodiments, the method can further comprise, prior to the act of locating the fiducial, exposing the fiducial to a lighting condition in which the fiducial is visible. In some embodiments, the fiducial comprises ultraviolet fluorescent material and the lighting condition is ultraviolet light. In some embodiments, the ultraviolet fluorescent material is an ultraviolet fluorescent ink. In some embodiments, the ultraviolet material is an ultraviolet fluorescent yarn.

In some embodiments, the fiducial includes light that is visible on the article. In some embodiments, a light source is disposed on an interior portion of the article and the light is visible on an exterior portion of the article.

In some embodiments, the fiducial includes a laser that is visible on the article. In some embodiments, the laser is disposed on an interior portion of the article and the laser is visible on an exterior portion of the article.

In some embodiments, the fiducial is disposed on a last. In some embodiments, the fiducial is a grid on the last. In some embodiments, the last comprises one of more lights which can make the grid visible through the article.

In some embodiments, locating the fiducial is performed using a shape model of the article.

In some embodiments, positioning the graphic is performed using a shape model of the article.

In some embodiments, the article is an article of footwear. In some embodiments, the article is an article of apparel.

In some embodiments, an article of manufacture can be fabricated according to any of the disclosed methods.

Figure 25:
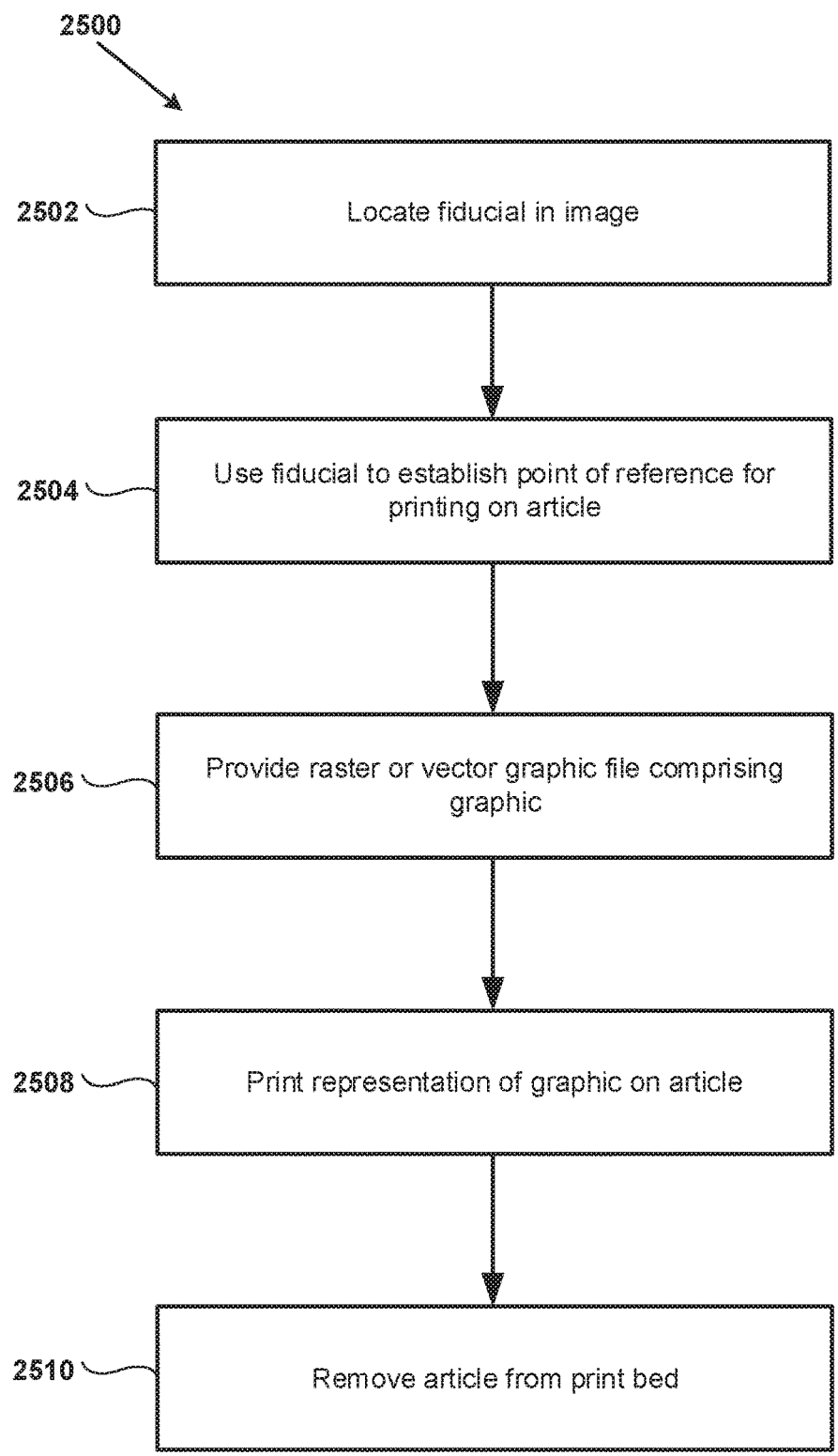
FIG. 25 depicts a flow chart outlining an exemplary method for printing onto an article.

FIG. 25 depicts an exemplary method 2500 for printing on an article. One or more steps of the method can be performed using a computer. The method 2500 can comprise locating a fiducial this is attached to a print bed of a printing device in an image of the article (process block 2502), using the fiducial to establish a point of reference for printing on the article (process block 2504), providing a raster or vector graphic file comprising the graphic (process block 2506), printing a representation of the graphic on the article (process block 2508), and removing the article from the print bed (process block 2510).

In some embodiments, the method further comprises receiving a first raster or vector graphic file comprising the graphic, transforming the graphic based on the point of reference, and generating the second raster or vector graphic file comprising the transformed graphic.

In some embodiments, transforming comprises at least one of or combination of the following: mirroring, rotating, stretching, distorting, resizing, coloring, cropping, clipping, fracturing, or masking the graphic or some portion of the graphic. Transforming the graphic produces a transformed graphic, which can then be printed onto an article to which such transformation specifically corresponds In some embodiments, the graphic is customer-selected, and is received with a customer order for the article.

In another representative embodiment, a method for printing to an article can comprise automatically detecting a physical feature of an article of footwear, including one or more of a printed object, a heel edge, a bite line, a cleat, edges of the upper, or any surface pattern, registering a printing device to the detected feature, and printing on the article.

In some embodiments, one or more computer-readable storage media storing computer-readable instructions that when executed by a computer, cause the computer to perform the disclosed methods.

Figure 26:
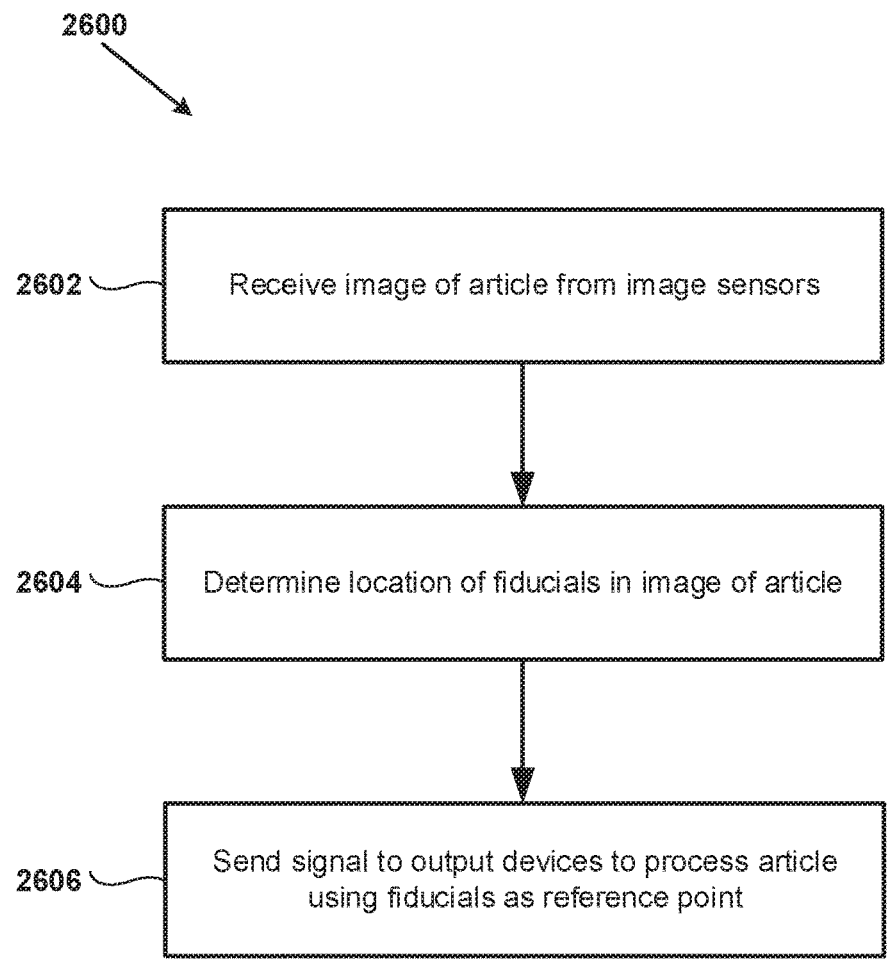
FIG. 26 depicts a flow chart outlining an exemplary method for printing onto an article.

In another representative embodiment, a system can comprise one or more image sensors, one or more processors, one or more output devices, and one or more computer-readable storage media storing computer-executable instructions that when executed by the processor, cause the system to perform an exemplary method 2600 of processing an article depicted in FIG. 26, the instructions comprising instructions to receive an image of the article from the one or more image sensors (process block 2602), instructions to determine a location of one or more fiducials in the image of the article (process block 2604), and instructions to send a signal to the one or more output devices to process the article using the one or more fiducials as a reference point (process block 2606).

In some embodiments, the one or more output devices comprise a printing device configured with a printhead for applying a graphic on the article.

In some embodiments, the one or more output devices comprise a cutting device configured with a laser for cutting the article.

In some embodiments, the one or more fiducials are attached to the output device, wherein the system further comprises one or more lasts that are coupled to the output device and on which the article is disposed, wherein the one or more lasts are configured to position the article with respect to the output device, and wherein the instructions further comprise instructions for determining a distance between the one or more fiducials attached to the output device and the article, and instructions to establish one or more points of reference for the output device based on a location of the fiducial.

In some embodiments, the one or more fiducials are movable relative to the one or more lasts. In some embodiments, the one or more lasts are movable relative to the one or more fiducials.

In some embodiments, the system comprises a plurality of image sensors.

In some embodiments, the plurality of image sensors comprises a first image sensor and a second image sensor, wherein the first image sensor has a first orientation relative to the article, wherein the second image sensor is spaced from the first image sensor and has a second orientation relative to the article, and wherein the instructions further comprise instructions for generating a three-dimensional image of the article based on a first image generated by the first image sensor and a second image generated by the second image sensor.

In some embodiments, the plurality of image sensors comprises a first image sensor and a second image sensor, wherein the first image sensor has a first orientation relative to a workspace of the output device, wherein the second image sensor is spaced from the first image sensor and has a second orientation relative to the workspace of the output device, and wherein the instructions further comprise instructions for generating a three-dimensional image of the workspace of the output device based on a first image generated by the first image sensor and a second image generated by the second image sensor.

In some embodiments, the output device includes a print bed. In some embodiments, the one or more fiducials are coupled to the print bed.

In some embodiments, the output device is a three-dimensional printing system.

In some embodiments, the instructions further comprise instructions to determine a distance from the one or more fiducials to a feature of the article, and instructions to scale a graphic based on the determined distance.

In some embodiments, the feature of the article is an edge of the article. In some embodiments, the feature of the article is a sockliner of the article.

In some embodiments, the one or more fiducials comprise a reference location. In some embodiments, the reference location is a center of gravity of the fiducial. In some embodiments, the reference location is an edge of the fiducial. In some embodiments, is a center of a bounding box of the fiducial.

Figure 27:
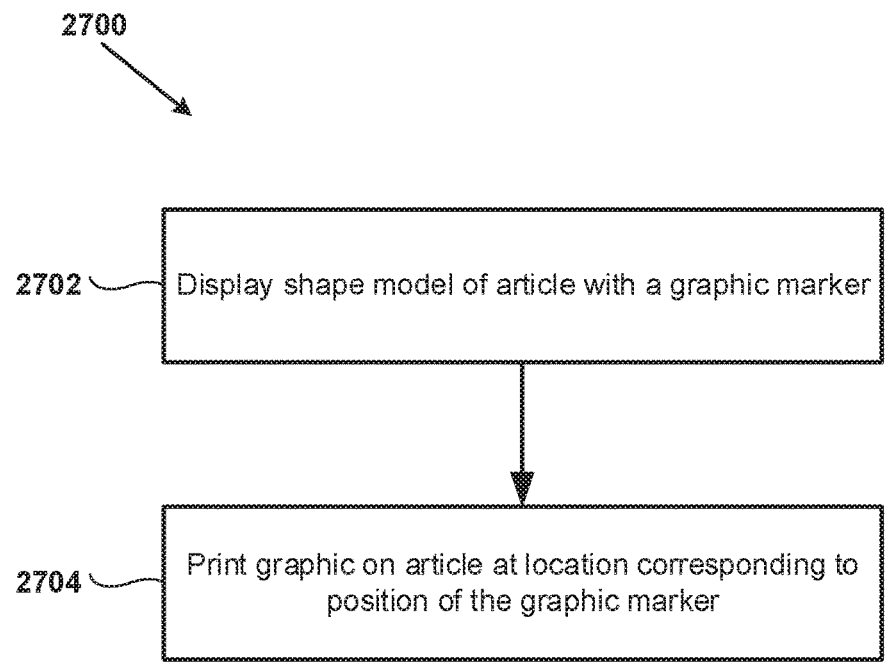
FIG. 27 depicts a flow chart outlining an exemplary method for printing onto an article.

In another representative embodiment, a system comprises one or more image sensors, one or more displays, one or more processors, one or more output devices, and one or more computer-readable storage media storing computer-executable instructions that when executed by the processor, cause the system to perform an exemplary method 2700 of processing article depicted in FIG. 27, the instructions comprising instructions to display a shape model of an article on the display, the shape model including a graphic marker (process block 2702) and instructions to print a graphic on the article at a location corresponding to the position of the graphic marker.

In some embodiments, the instructions further comprise instructions to display a region of interest of the shape model on the display. In some embodiments, the instructions further comprise instructions to display a fiducial.

In some embodiments, the instructions further comprise instructions to display a print bed.

In some embodiments, the instructions further comprise instructions to display a graphical marker used in the shape model.

In some embodiments, the instructions further comprise instructions to display a manifest of parameters of the shape model.

Figure 28:
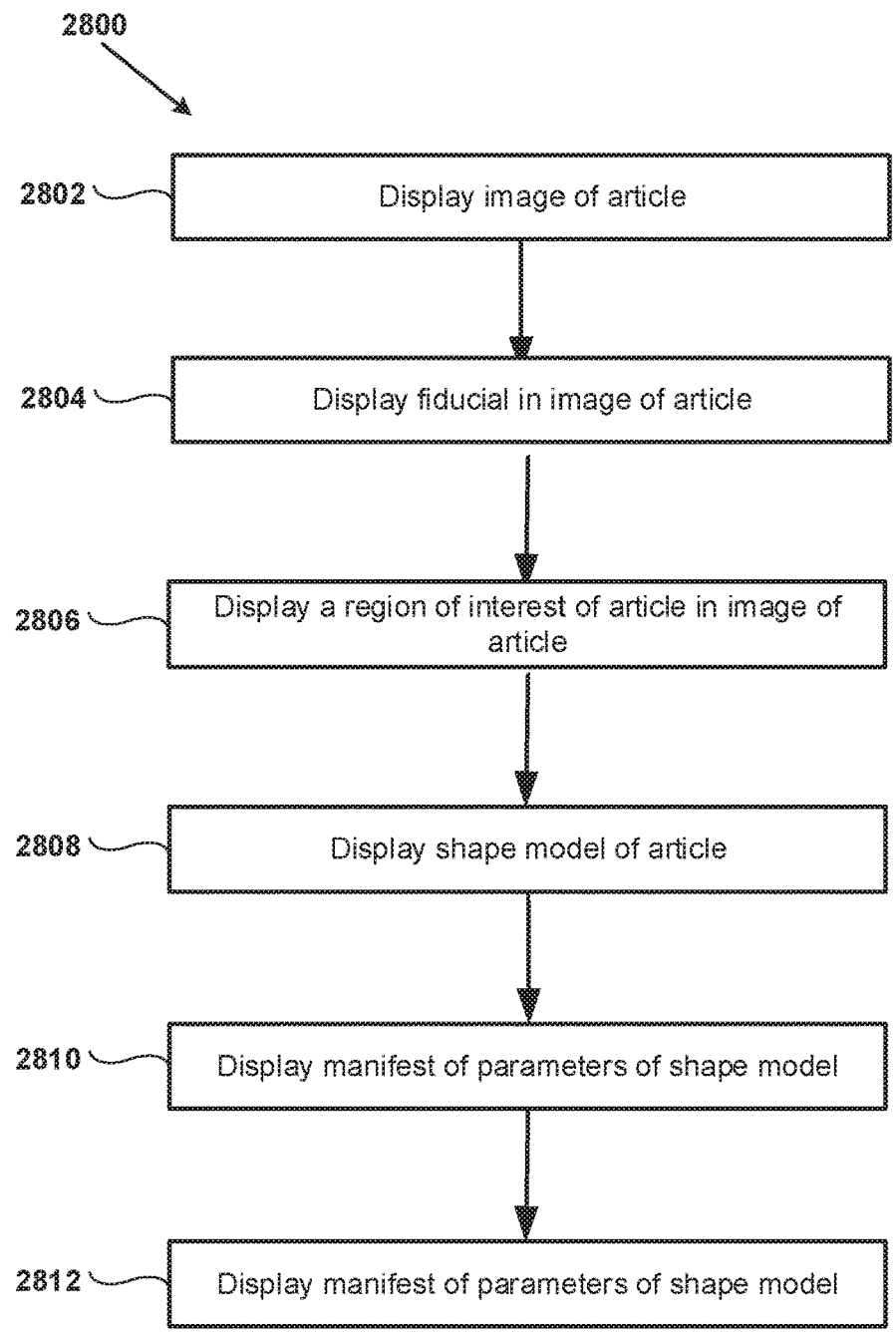
FIG. 28 depicts a flow chart outlining an exemplary method for printing onto an article.

FIG. 28 depicts an exemplary method 2800 for printing on an article. The method 2800 can comprise displaying an image of an article (process block 2802), displaying a fiducial in the image of the article (process block 2804), displaying a region of interest of the article in the image of the article (process block 2806), displaying a shape model of the article (process block 2808), displaying a manifest of parameters of the shape model (process block 2810), and based on the location of the fiducial and the parameters of the shape model, providing an indication that the article is aligned or is misaligned (process block 2812).

Figure 29:
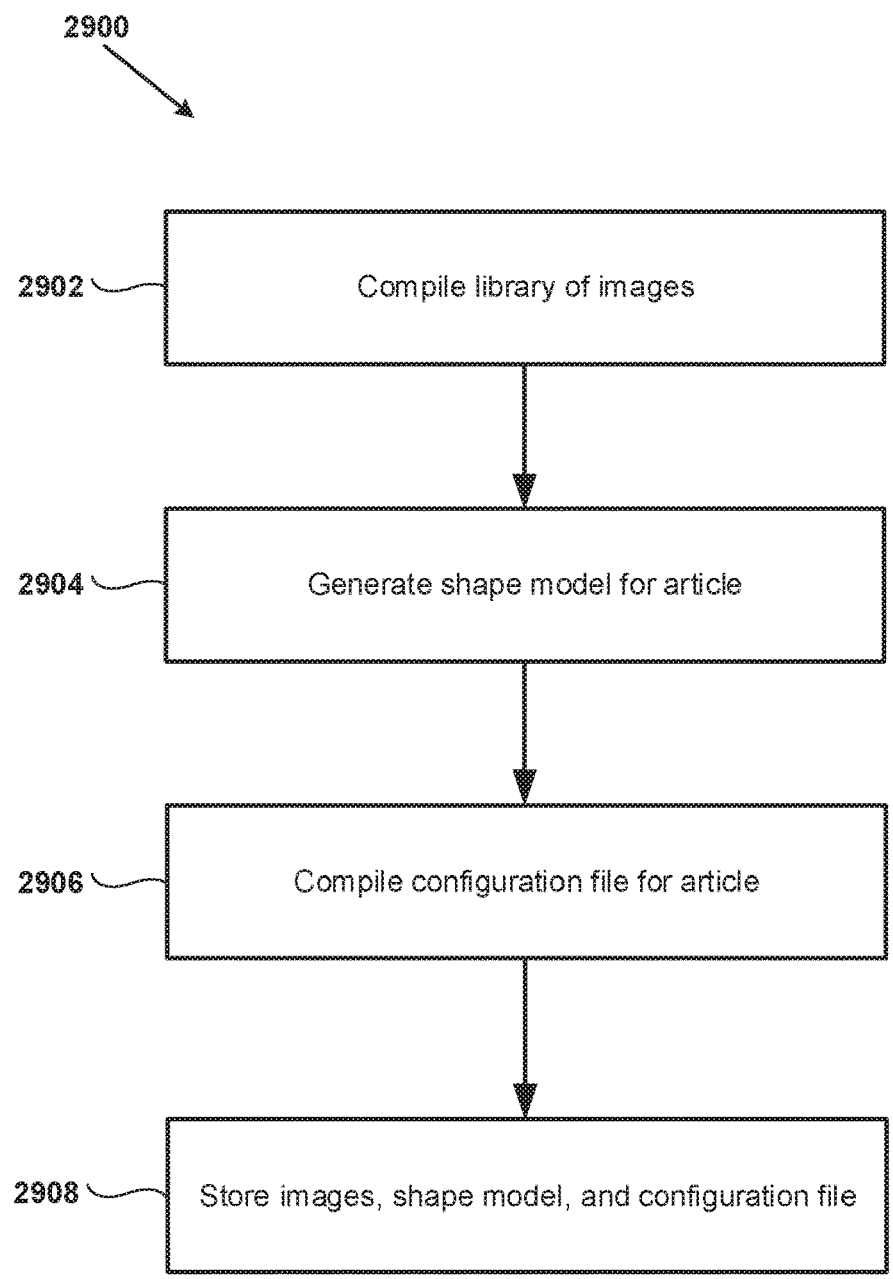
FIG. 29 depicts a flow chart outlining an exemplary method for printing onto an article.

FIG. 29 depicts an exemplary method 2900 for printing on an article. The method 2900 can comprise compiling a library of images (process block 2902), generating a shape model for an article (process block 2904), and compiling a configuration file for the article that includes parameters of the article based on a size of the article (process block 2906), and storing the images, the shape model, and the configuration file in a computer-readable medium (process block 2908).

In some embodiments, the library of images and the shape model is based on an article having a first size, and the method further comprises scaling a graphic to be printed on the article to a second size.

In some embodiments, the graphic is scaled using a table. In some embodiments, the graphic is scaled using an equation.

In some embodiments, the method further comprises transmitting data from a first location to a second location.

In some embodiments, a method for printing on an article comprises receiving data from a party performing any of the disclosed methods. In some embodiments, the method further comprises using the data to print a graphic on the article.

In some embodiments, the method further comprises obtaining the configuration based on a bar code. In some embodiments, the method further comprises obtaining the configuration file based on a quick response code. In some embodiments, the method further comprises obtaining the configuration from a watermark printed on the article.

In some embodiments, the method further comprises identifying a region of interest on the article. In some embodiments, the region of interest is selected by a user. In some embodiments, the region of interest is selected by a computing device.

In another representative embodiment, a system comprises an image of an article, a display of a fiducial, and a display of a region of interest of the article.

In some embodiments, the graphical user interface further comprises a display of a graphic marker placed on the image of the article, and a display of a location of the graphical marker relative to the fiducial.

In some embodiments, a user can move the graphical marker relative to the article.

In some embodiments, the image is a black and white image. In some embodiments, the image is a grayscale image. In some embodiments, the image is a color image. In some embodiments, the image is filtered with a color filter of the image sensor.

In some embodiments, the fiducial is a sacrificial material on the article. In some embodiments, the graphic marker represents a graphic to be printed on the article, and the graphic is provided by a user. In some embodiments, the graphic marker represents a graphic to be printed on the article, and the graphic is provided by a third party.

In view of the many possible embodiments to which the principles of the disclosure may be applied, it should be recognized that the illustrated embodiments are only preferred examples and should not be taken as limiting the scope of the claims. Rather, the scope of the claimed subject matter is defined by the following claims and their equivalents.

The invention claimed is:

1. A method for printing on article, comprising:
    positioning an article in a print bed of a printing device, wherein a fiducial is disposed in the print bed;
    generating an image of the article and the fiducial;
    locating the fiducial in the image;
    using the fiducial to establish a point of reference relative to a print location on the article;
    providing a raster or vector graphic file comprising a graphic;
    printing a representation of the graphic on the article at the print location; and
    removing the article from the print bed.

2. The method of claim 1, wherein the raster or vector graphic file is a second raster or vector graphic file, and wherein the graphic is a transformed graphic, and prior to printing the representation of the graphic on the article at the print location, the method further comprises:
    receiving a first raster or vector graphic file comprising a first graphic;
    transforming the first graphic based on the point of reference; and
    generating the second raster or vector graphic file comprising the transformed graphic.

3. The method of claim 2, wherein transforming the first graphic based on the point of reference comprises one or more of mirroring, rotating, stretching, resizing, coloring, cropping, clipping, fracturing, or masking the transformed graphic.

4. The method of claim 2, wherein the image is a first image, wherein prior to printing the representation of the graphic on the article, and the method further comprises displaying a second image of the article with the transformed graphic disposed thereon.

5. The method of claim 1, wherein the raster or vector graphic file is received with a customer order for the article via a computer network.

6. The method of claim 1, further comprising storing the raster or vector graphic file on a computer-readable storage media.

7. The method of claim 1, wherein locating the fiducial comprises automatically detecting, by a computer, a physical feature of an article of footwear, including one or more of a printed object, a heel edge, a bite line, a cleat, edges of an upper, or any surface pattern of the article.

8. The method of claim 1, wherein the print location includes a first directional coordinate, a second directional coordinate, and a rotational orientation.

9. The method of claim 1, wherein prior to printing the representation of the graphic on the article at the print location, the method further comprises determining a size of the article based on one or more dimensions from the point of reference to the print location.

10. The method of claim 9, further comprising scaling the graphic based on the size of the article.

11. The method of claim 1, wherein the fiducial comprises a logo disposed on the article.

12. The method of claim 1, wherein the article comprises an article of footwear.

13. The method of claim 1, wherein the article comprises an article of apparel.

14. A method for printing on an article, comprising:
    selecting a shape model from a storage or a network with a computing device, wherein the shape model is generated from a first image of a first article, wherein the shape model includes a fiducial, a reference location, and a raster or vector graphic file comprising a graphic, wherein the fiducial is located in the first image of the first article, wherein the reference location is based on a location of the fiducial in the first image of the first article, and wherein the graphic is positioned at a pre-selected location relative to the reference location;
    positioning a second article in a print bed of a printing device;
    generating a second image of the second article;
    locating the fiducial in the second image of the second article, by the computing device, wherein the second article comprises one or more characteristics that are different than one or more corresponding characteristics of the first article;
    establishing the reference location in the second image of the second article;
    positioning the graphic within the second image of the second article at the pre-selected location; and
    printing a representation of the graphic on the second article at a print location, wherein the print location corresponds to the pre-selected location of the graphic on the second image of the second article.

15. The method of claim 14, wherein the fiducial is attached to a post that is coupled to the print bed.

16. The method of claim 15, further comprising moving the post relative to the print bed and the article.

17. The method of claim 16, wherein locking the post relative to the print bed and the article with a locking mechanism, wherein the locking mechanism comprises a spring, a plurality of teeth, and a plurality of grooves.

18. A method for printing on article, comprising:
    positioning an article in a print bed of a printing device, wherein a fiducial is disposed on a surface of a fiducial support member, wherein the fiducial support member is adjustably coupled to the print bed;

moving the fiducial support member from a reset configuration to a set configuration, wherein in the set configuration, the surface of the fiducial support member on which the fiducial is disposed is aligned with a first surface of the article;

generating an image of the article and the fiducial;

locating the fiducial in the image;

using the fiducial to establish a point of reference relative to a print location on the article;

providing a raster or vector graphic file comprising a graphic;

printing a representation of the graphic on the article at the print location; and removing the article from the print bed.

19. The method of claim 18, further comprising locking the fiducial support member in the set configuration.

20. The method of claim 18, further comprising moving the fiducial support member from the set configuration to the reset configuration.

* * * * *